(12) United States Patent
Hovanky et al.

(10) Patent No.: US 8,736,674 B2
(45) Date of Patent: May 27, 2014

(54) METHOD AND SYSTEM FOR 3D DISPLAY CALIBRATION WITH FEEDBACK DETERMINED BY A CAMERA DEVICE

(75) Inventors: Thao Hovanky, San Francisco, CA (US); Gopal Erinjippurath, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 534 days.

(21) Appl. No.: 13/179,291

(22) Filed: Jul. 8, 2011

(65) Prior Publication Data

US 2012/0075435 A1    Mar. 29, 2012

Related U.S. Application Data

(63) Continuation-in-part of application No. 12/888,873, filed on Sep. 23, 2010.

(51) Int. Cl.
  *H04N 13/04*    (2006.01)
  *H04N 17/02*    (2006.01)
  *H05B 41/36*    (2006.01)

(52) U.S. Cl.
  USPC .............................. 348/51; 315/158; 348/177

(58) Field of Classification Search
  None
  See application file for complete search history.

(56) References Cited

U.S. PATENT DOCUMENTS

| | | |
|---|---|---|
| 6,771,307 B2 | 8/2004 | Waki |
| 7,133,148 B2 | 11/2006 | Silverstein |
| 7,167,197 B2 | 1/2007 | Hill et al. |
| 7,187,343 B2 | 3/2007 | Pate |
| 7,262,779 B1 * | 8/2007 | Sones .......................... 345/589 |
| 7,639,260 B2 | 12/2009 | Bala |
| 7,639,401 B2 | 12/2009 | Bala |
| 7,728,845 B2 | 6/2010 | Holub |
| 7,733,404 B2 | 6/2010 | Zandifar et al. |
| 7,911,485 B2 | 3/2011 | Rykowski |
| 2004/0196250 A1 | 10/2004 | Mehrotra |
| 2007/0171380 A1 | 7/2007 | Wright |
| 2007/0279390 A1 | 12/2007 | Loukianov |

(Continued)

FOREIGN PATENT DOCUMENTS

| | | |
|---|---|---|
| CN | 101576379 | 11/2009 |
| CN | 101692690 | 4/2010 |

(Continued)

OTHER PUBLICATIONS

Bala, et al., "A Camera-based Method for Calibrating Projection Color Displays" 14th Color Imaging Conference Final Program and Proceedings, copyright 2006 Society for Imaging Science and Technology, pp. 148-152.

(Continued)

*Primary Examiner* — Dave Czekaj
*Assistant Examiner* — Nam Pham

(57) ABSTRACT

Several embodiments of 3D display system and systems and methods for their calibration are disclosed herein. In one embodiment, a method and system for calibrating a 3D display using feedback indicative of measurements of light, emitted from the 3D display (typically during display of a test pattern), by a camera device. In one embodiment, the camera device is a handheld camera device including an inexpensive, uncalibrated camera. In another class of embodiments, a system including a 3D display (to be recalibrated), a video preprocessor coupled to the display, and a feedback subsystem including a camera device operable to measure light emitted by the display are also disclosed.

36 Claims, 13 Drawing Sheets

(56) References Cited

U.S. PATENT DOCUMENTS

| | | |
|---|---|---|
| 2008/0062164 A1 | 3/2008 | Bassi |
| 2008/0088649 A1 | 4/2008 | Ikeno |
| 2008/0100805 A1 | 5/2008 | Majumder |
| 2008/0218501 A1 | 9/2008 | Diamond |
| 2008/0259289 A1 | 10/2008 | Nozaki |
| 2009/0066857 A1 | 3/2009 | Camp, Jr. |
| 2010/0079703 A1 | 4/2010 | Chung |
| 2010/0208044 A1 | 8/2010 | Robinson |
| 2011/0279749 A1 | 11/2011 | Erinjippurath |
| 2012/0062607 A1 | 3/2012 | Erinjippurath |
| 2012/0127324 A1 | 5/2012 | Dickins |

FOREIGN PATENT DOCUMENTS

| | | |
|---|---|---|
| EP | 1079605 | 2/2001 |
| EP | 1116385 | 2/2004 |
| JP | 2005-176351 | 6/2005 |
| JP | 2007-329591 | 12/2007 |
| KR | 10-2001-0016154 | 2/2011 |
| WO | 0018138 | 3/2000 |
| WO | 2007027854 | 3/2007 |
| WO | 2007085081 | 8/2007 |
| WO | 2008144370 | 11/2008 |

OTHER PUBLICATIONS

Bhasker, et al., "Asynchronous Distributed Calibration for Scalable and Reconfigurable Multi-Projector Displays" IEEE Transactions on Visualization and Computer Graphics, vol. 12, No. 5, Sep./Oct. 2006; pp. 1101-1108.

Gerhardt, Jeremie, "Simple HDR Approach for Projector Spatial Non-Uniformity Correction", pp. 1-8, 2009.

Kim, et al., "Color Correction Using a Still Camera for Images Projected onto a Light Colored Screen" Journal of Imaging Science and Technology, published on Mar. 2011, vol. 55, No. 2, 13 pages.

Steele, et al., "Color Calibration of Multi-Projector Displays through Automatic Optimization of Hardware Settings" 2009 IEEE Computer Society Conference on Computer Vision and Pattern Recognition Workshops, pp. 55-60.

Tansley et al., "Image photometry applied to measuring visual displays", Flat Panel Display Technology and Display Metrology II, Edward F. Kelley, Tolis Voutsas, Editors, 188 Proceedings of SPIE vol. 4295 (2001) © 2001.

Dallas et al., "Image quality analysis of a color LCD as well as a monochrome LCD using a Foveon color CMOS camera", Penetrating Radiation Systems and Applications VIII; Proc. of SPIE vol. 6707, 67070U, (Aug. 2007), edited by F. Patrick Doty, et al.; Department of Radiology, University of Arizona, Tucson AZ, 85724; pp. 67070U1-67070U10.

Tyler, et al., "Real-Time Projector Tracking on Complex Geometry Using Ordinary Imagery", Computer Vision and Pattern Recognition, 2007.CVPR '07, published on Jun. 17-22, 2007; pp. 1-8.

Brown, et al., "Camera-Based Calibration Techniques for Seamless Multiprojector Displays", Transactions on Visualization and Computer Graphics, vol. 11, No. 2, published on Mar./Apr. 2005; pp. 193-206.

"UIImagePickerControllerDelegate Protocol Reference", Apple, Inc., Aug. 19, 2010; pp. 3-12.

Connolly, et al., "Colour measurement by video camera", JSDC vol. 111, published Dec. 1995, pp. 373-375.

Connolly, et al., "The Use of Video Cameras for Remote Colour Measurement", JSDC vol. 112, published Feb. 1996, pp. 40-43.

Reinhard, et al., "Photographic Tone Reproduction for Digital Images" ACM Transactons on Graphics, vol. 21, Issue 3, Jul. 2002, pp. 267-276.

\* cited by examiner

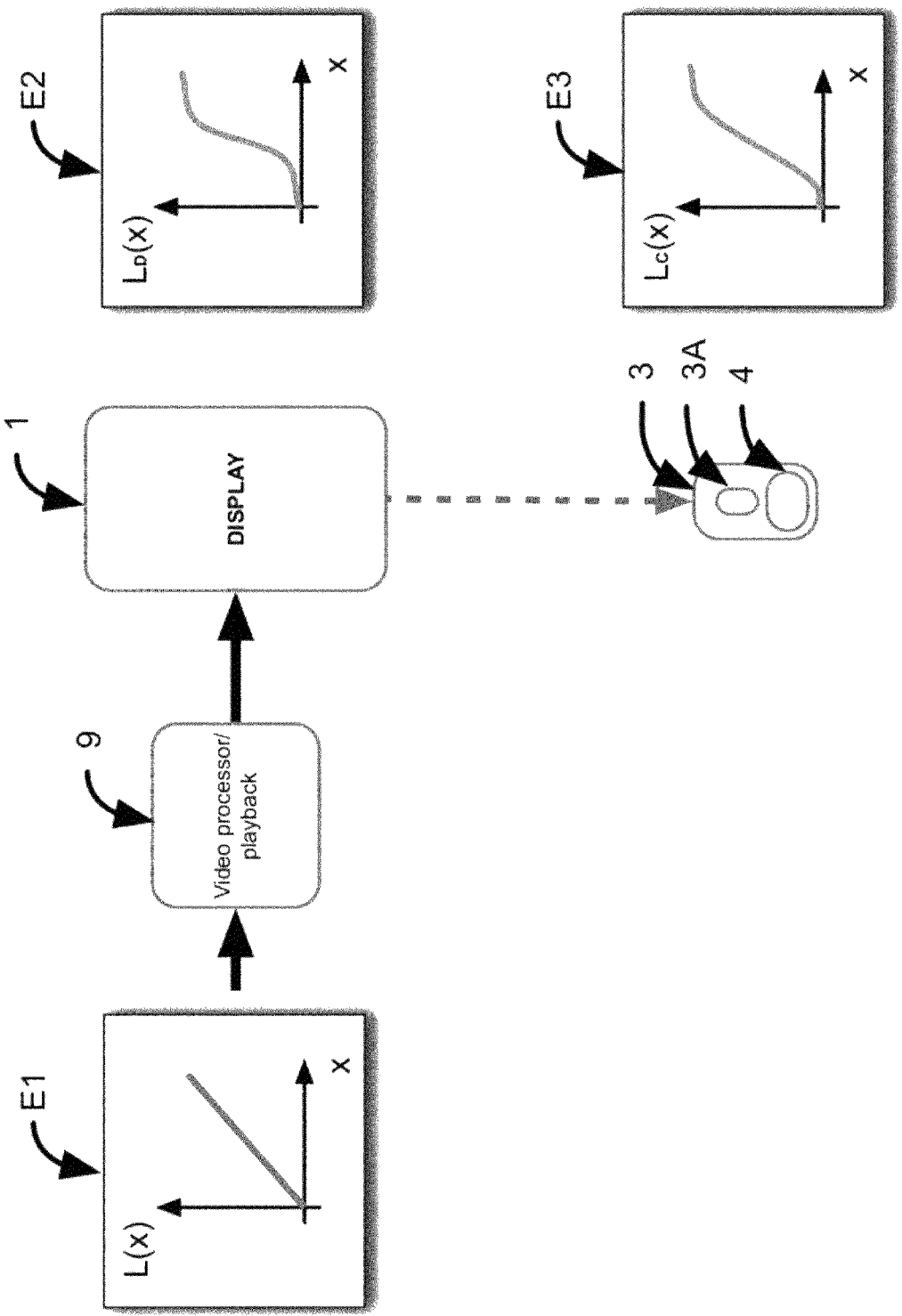

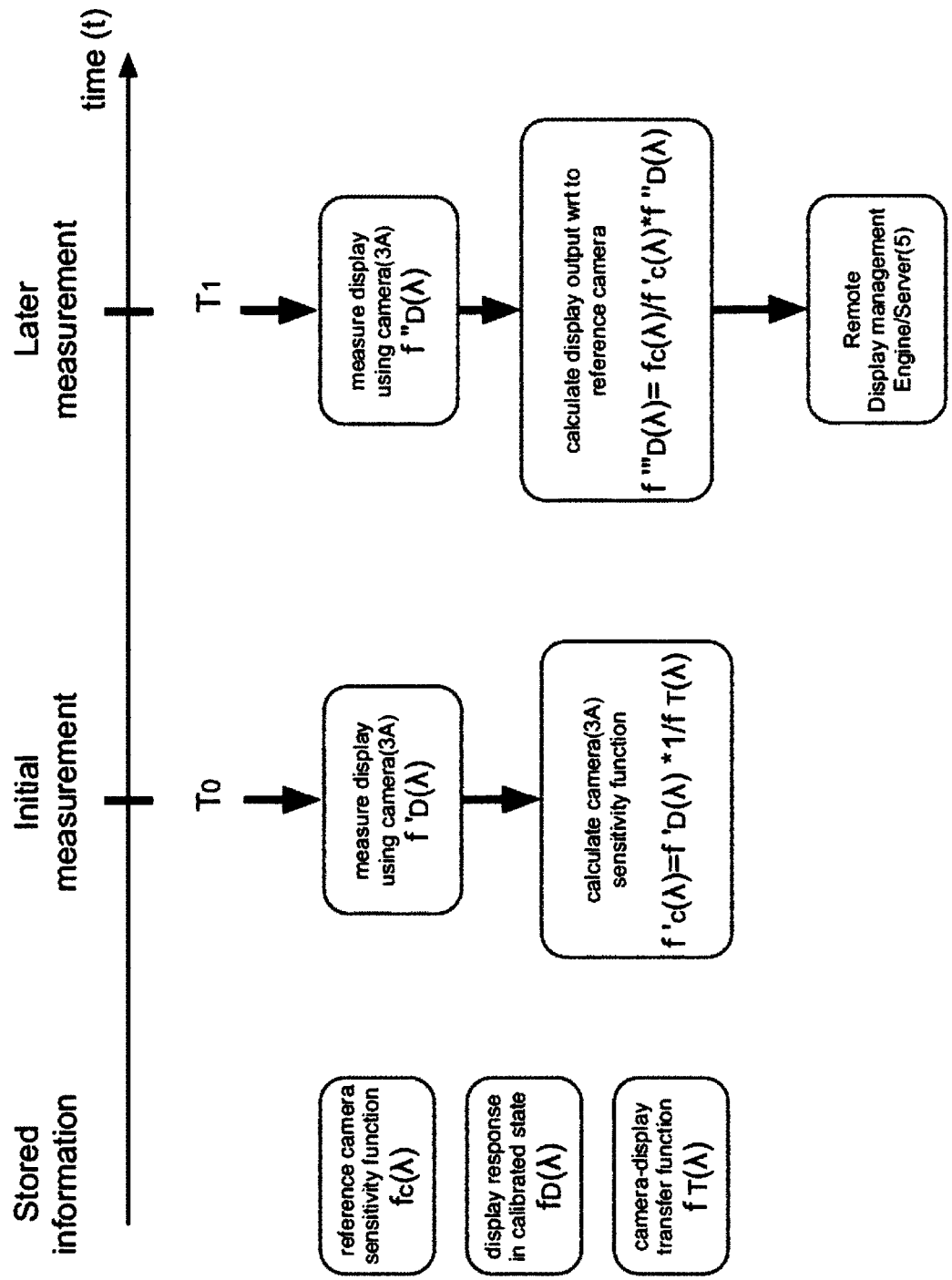

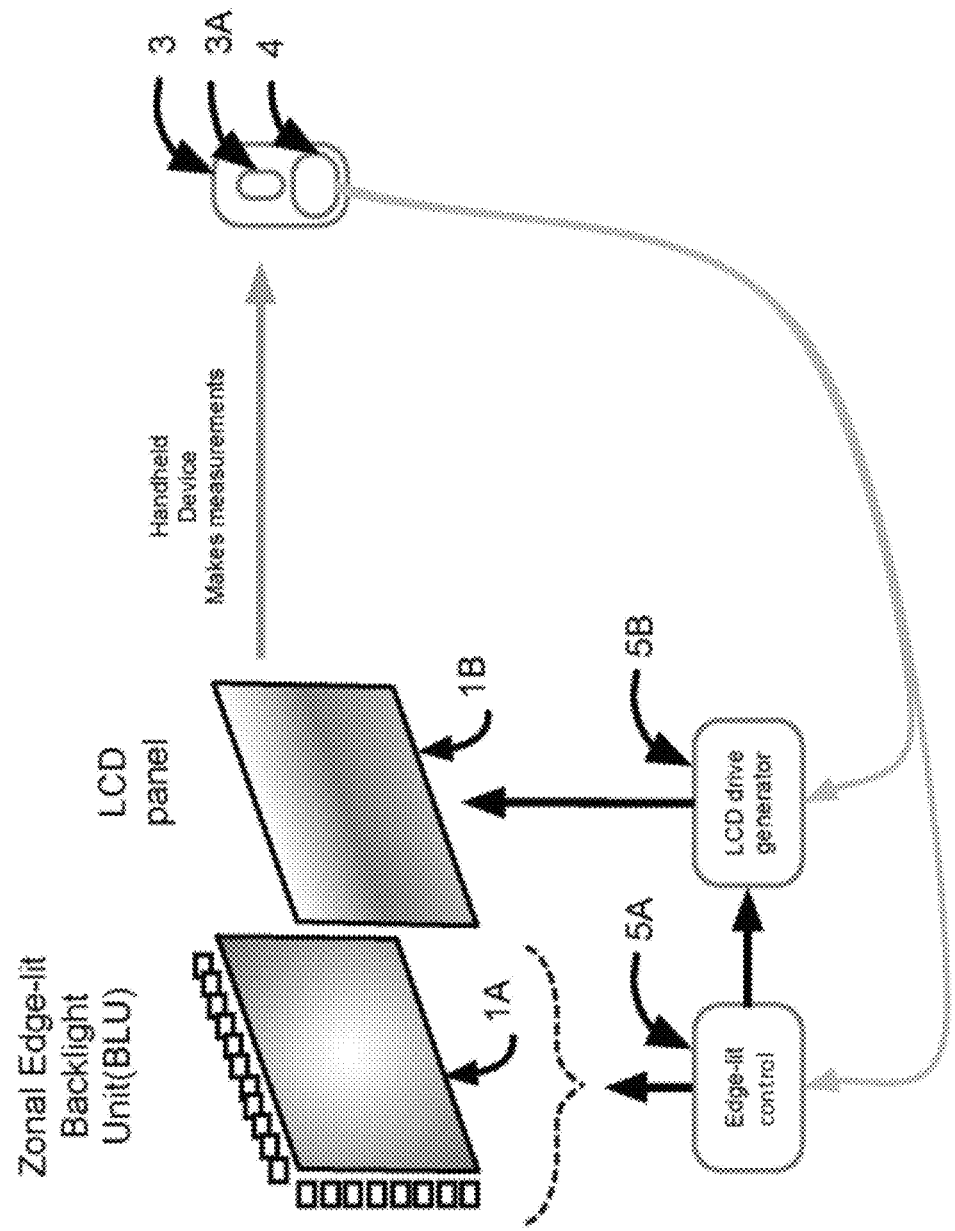

METHOD AND SYSTEM FOR 3D DISPLAY CALIBRATION WITH FEEDBACK DETERMINED BY A CAMERA DEVICE

CROSS-REFERENCE TO RELATED APPLICATIONS

This Patent Application is a Continuation-in-Part (CIP) Application, and claims the benefit of, a co-pending Application with a Ser. No. 12/888,873 filed by a common Inventor of this Application on Sep. 23, 2010. The disclosure made in the application Ser. No. 12/888,873 is hereby incorporated by reference in its entirety.

BACKGROUND OF THE INVENTION

1. Field of the Invention

Some embodiments of the invention relate to systems and methods for calibrating a 3D display and, more particularly, to using a camera device (e.g., a handheld camera device) to calibrate such 3D displays.

2. Background of the Invention

Throughout this disclosure including in the claims, the expression performing an operation "on" signals or data (e.g., filtering or scaling the signals or data) is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the expression "system" is used in a broad sense to denote a device, system, or subsystem. For example, a subsystem that implements a filter may be referred to as a filter system, and a system including such a subsystem (e.g., a system that generates X output signals in response to multiple inputs, in which the subsystem generates M of the inputs and the other X-M inputs are received from an external source) may also be referred to as a filter system.

Throughout this disclosure including in the claims, the noun "display" and the expression "display device" are used as synonyms to denote any device or system operable to display an image or to display video in response to an input signal. Examples of displays are computer monitors, television sets, and home entertainment system monitors or projectors.

Throughout this disclosure including in the claims, the terms "calibration" and "recalibration" of a display denote adjusting at least one parameter or characteristic of the display, e.g., a color, brightness, contrast, and/or dynamic range characteristic of the display. For example, recalibration of a display device can be implemented by performing preprocessing on input image data (to be displayed by the display device) to cause the light emitted by the display device in response to the preprocessed image data (typically after further processing is performed thereon) to have one or more predetermined color, brightness, contrast, and/or dynamic range characteristics.

Throughout this disclosure including in the claims, the term "processor" is used in a broad sense to denote a system or device programmable or otherwise configurable (e.g., with software or firmware) to perform operations on data (e.g., video or other image data). Examples of processors include a field-programmable gate array (or other configurable integrated circuit or chip set), a digital signal processor programmed and/or otherwise configured to perform pipelined processing on video or other image data, a programmable general purpose processor or computer, and a programmable microprocessor chip or chip set.

Throughout this disclosure including in the claims, measured "light intensity" is used in a broad sense, and can denote measured luminance or another measured indication of light intensity appropriate in the context in which the expression is used.

Throughout this disclosure including in the claims, the term "camera" is used in a broad sense to denote a light sensor (e.g., a colorimeter or other sensor whose output can be analyzed to determine a color or frequency spectrum of sensed light), or a camera including an image sensor array (e.g., a CCD camera), or a camera of any other type. Typical embodiments of the invention employ a handheld camera device which includes a camera operable to sense an image displayed by a monitor or other display and to output data indicative of the sensed image (or one or more pixels thereof).

Throughout this disclosure including in the claims, the expression "camera device" denotes a device which includes (e.g., is) a camera and a processor coupled to receive the camera's output, and which is operable to measure at least one characteristic of light emitted by a display device (e.g., while the display device displays at least one test image) in a manner emulating measurement of the same light by a reference camera having known sensitivity function but without preknowledge of the sensitivity function of the camera device's camera. For example, a mobile phone which includes a camera and a processor coupled to receive the camera's output may be a camera device as defined in this paragraph. Typical embodiments of the invention include or employ a camera device which is a handheld device ("HHD") or other portable device. Other embodiments of the invention include or employ a camera device which is not readily portable. In typical embodiments of the invention, a camera device (e.g., implemented as an HHD) is operable to download data indicative of a prior characterization or calibration of a display (e.g., data indicative of a sensitivity function of a reference camera employed to perform the prior characterization or calibration) and to measure at least one characteristic of light emitted by the display using the camera device's camera and the downloaded data in connection with a recalibration of the display. In a display characterizing operation (preliminary to color calibration of a display using a camera device in some embodiments of the invention), a reference camera having a known sensitivity function is used to measure the display's output as a function of wavelength in response to test colors and a white point. A set of reference values (e.g., values of a transfer function that matches the display's response for each test color and white point to the reference camera's response, and values of the reference camera's sensitivity function) are stored and later provided to the camera device, so that the camera device's output in response to light emitted by the display (e.g., during display of at least one test image) can be used with the reference values to emulate measurement of the same light by the reference camera.

It is conventional for a user to manually adjust controls of a display device to adjust or calibrate the device while the device displays test patterns (e.g., in response to test pattern data read from a DVD or other disk). While a display device displays test patterns, it is also conventional to use a colorimeter or camera to generate data that characterize the display device and/or data indicative of recommended settings for adjusting or calibrating the display device (e.g., to match target settings). With knowledge of such data, a user can manually adjust (or enter commands which cause adjustment of) controls of the display device to obtain a visually pleasing and/or acceptable displayed image appearance or to match target settings. It is also conventional to use such data to generate control values, and to assert the control values to a graphics card of the display device to calibrate the display device. For example, it is known to use a computer programmed with appropriate software to generate control values which determine look-up tables (LUTs) in response to such data and to assert the control values to the graphics card (e.g., to match target settings previously provided to the computer).

In professional reference environments (e.g., studios and post production facilities), such conventional techniques can be used to calibrate a display for use as a reference to grade content and adjust color, brightness, contrast, and/or tint parameters of content. An off-calibrated display can lead to dire consequences in the production environment and repair and/or recalibration can be very expensive. In such environments, there is a need for a closed-loop, carefully characterized measurement system that can automatically correct for variations in display calibration.

There is also a need for a closed-loop, carefully characterized measurement system that can automatically correct for variations in calibration of displays in a variety of environments (e.g., home entertainment system displays, and displays of home or business computer systems) without the need for the user to employ a highly calibrated imaging colorimeter (such colorimeters are typically expensive and difficult to set up) or other expensive, calibrated light or image sensor(s). Displays often need to be recalibrated in the field (e.g., in consumers' homes) with minimal field support, and often need to adapt to different external lighting environments. It had not been known before the present invention how to implement such a system with a camera device whose camera has a sensitivity function that is unknown "a priori" (e.g., an inexpensive handheld camera device including an inexpensive, uncalibrated camera) but which is operable to measure light emitted by a display in a manner emulating measurements by a reference camera having a known sensitivity function (e.g., an expensive, highly calibrated imaging colorimeter).

There is also a need for a closed-loop, carefully characterized measurement and calibration system that can automatically and dynamically correct for variations in calibration of a display, where the display is not configured to be calibrated (e.g., recalibrated) automatically in response to control signals generated automatically (without human user intervention) in response to camera measurements of light emitted by the display. For example, such a display may be configured to be recalibrated only in response to a human user's manual adjustment of color, brightness, contrast, and/or tint controls, or it may be the display device of a computer system that can be adjusted or recalibrated only in response to commands entered by human user by manually actuating an input device of the system (e.g., by entering mouse clicks while viewing a displayed user interface). Displays of this type often need to be recalibrated in the field with minimal field support, and should dynamically adapt to different external lighting environments. However, it had not been known before the present invention how to implement a closed-loop, carefully characterized measurement system to automatically correct for variations in calibration of a display of this type (including variations resulting from changes in external lighting environment).

For the calibration of 3D display (for example, 3D projector display systems), it is known that such 3D display systems may go out of calibration with respect to color and luminance image reproduction. This may be additionally problematic if, for example, a 3D projector uses other components, such as a filter wheel whose calibration itself may be suspect. Switchable filter wheels like the Dolby CAT-832 assembly can introduce additional challenges in terms of the calibration of the color separation based 3D projection system. As with its 2-D display cousins, 3D displays may desirably be dynamically adaptable to external lighting environments.

BRIEF DESCRIPTION OF THE INVENTION

In a class of embodiments, the invention is a method and system for calibrating a 3D display using feedback indicative of measurements, by a camera of a camera device, of light emitted from the 3D display, said camera having a sensitivity function that is unknown a priori. The camera's sensitivity function is unknown "a priori" in the sense that although it may be determined during performance of the inventive method from measurements by the camera and reference values that do not themselves determine the camera's sensitivity function, it need not be (and typically is not) known before performance of the inventive method. To characterize the 3D display, the camera senses light emitted from the display (typically during display of at least one test pattern) and in response to the camera output, the camera device generates measurement data indicative of the light emitted, such that the measurement data emulate measurement of the light by a reference camera having known sensitivity function (e.g., a highly calibrated imaging colorimeter or other calibrated reference camera) in the sense that the measurement data are indicative of at least one measurement of said light by the reference camera. Typically, the camera device is a handheld camera device whose camera is an inexpensive, uncalibrated camera. In typical embodiments, the camera device includes a processor coupled and configured (e.g., programmed with software) to generate the measurement data (i.e., to receive raw output from the camera and process the raw output to generate the measurement data) and send the measurement data as feedback to a remote server.

In a second class of embodiments, the inventive system includes a 3D display (to be recalibrated), a video preprocessor coupled to the display, and a feedback subsystem including a handheld device (e.g., a handheld camera device) operable to measure light emitted by the display. The feedback subsystem is coupled and configured to generate preprocessor control parameters automatically in response to measurement data (indicative of measurements by the handheld device) and to assert the preprocessor control parameters as calibration feedback to the video preprocessor. The video preprocessor is operable to calibrate (e.g., recalibrate) the display in response to the control parameters, by filtering input image data (e.g., input video data) to be displayed (e.g., to automatically and dynamically correct for variations in calibration of the display). The preprocessor control parameters are generated automatically, by the handheld device alone or (preferably) by the handheld device in combination with a remote display management server (or other remote device) of the feedback subsystem. In the second class of embodiments, the inventive system has a feedback control loop architecture. In some preferred embodiments in the second class, the feedback subsystem includes a remote server, the handheld device includes a processor coupled and configured (e.g., programmed with software) to generate the measurement data and send said measurement data to the remote server (e.g., over the internet or another network), and the remote server is configured to generate the preprocessor control parameters automatically in response to the measurement data. In some embodiments in the second class, the handheld device includes a processor coupled and configured (e.g., programmed with software) to generate the measurement data, to generate the preprocessor control parameters in response to said measurement data, and to send the preprocessor control parameters to the video preprocessor (e.g., over the internet or another network).

HHD-based calibration methodology may be desirable in managing variations on projection screen gains. Typical digital 3D technologies lose significant amount of light transmission due to filters in light path and 3-D glasses. An exemplary theater has multiple screens, some or all of which may or may not have identical gains, dimensional or geometrical shapes. Since projectors are not necessarily stationary and could be wheeled to different screening rooms in a multiplex, data collected on varied gains will facilitate efficient management of screen-specific configurations. The result may be an efficient mechanism in managing multiple screens of varied amount of reflected light levels, regardless of screen classification, geometrical shapes or projection technologies.

In another embodiment, the HHD-based calibration system may be employed in a circular polarization system and may act as a dynamic seat map generator, identifying seats that are subjected to ghosting or hot-spotting. In this way, affected seats could be blocked out to ensure a premium viewing experience for the patron. With circular polarization, a silver screen is necessary in order to maintain circular polarization and increased level of brightness. The use of the silver screen creates hot spots while reducing the number of seats in the sweet spot. This is due to the limited amount of light generated from the projector in off axis seating which includes many seats to the leftmost and rightmost of the screen. When 2D content is played back in the same auditorium, the presence of the hot spot results in a poor viewing experience with occupied off axis seating.

In another embodiment, the HHD-based calibration system can be used to dynamically and/or iteratively update the projection system using the techniques described in the specification using a form of near field communication (NFC) or Bluetooth.

BRIEF DESCRIPTION OF THE DRAWINGS

FIG. 3A is a block diagram of an embodiment of the calibration system.

FIG. 7 is a chart of quantities generated or used, and steps performed, in some embodiments.

FIG. 8 is a block diagram of another embodiment of a direct view LCD system and calibration.

DETAILED DESCRIPTION OF THE PREFERRED EMBODIMENTS

Embodiments of the inventive system and method will be described with reference to FIGS. 1-3.

Figure 1:
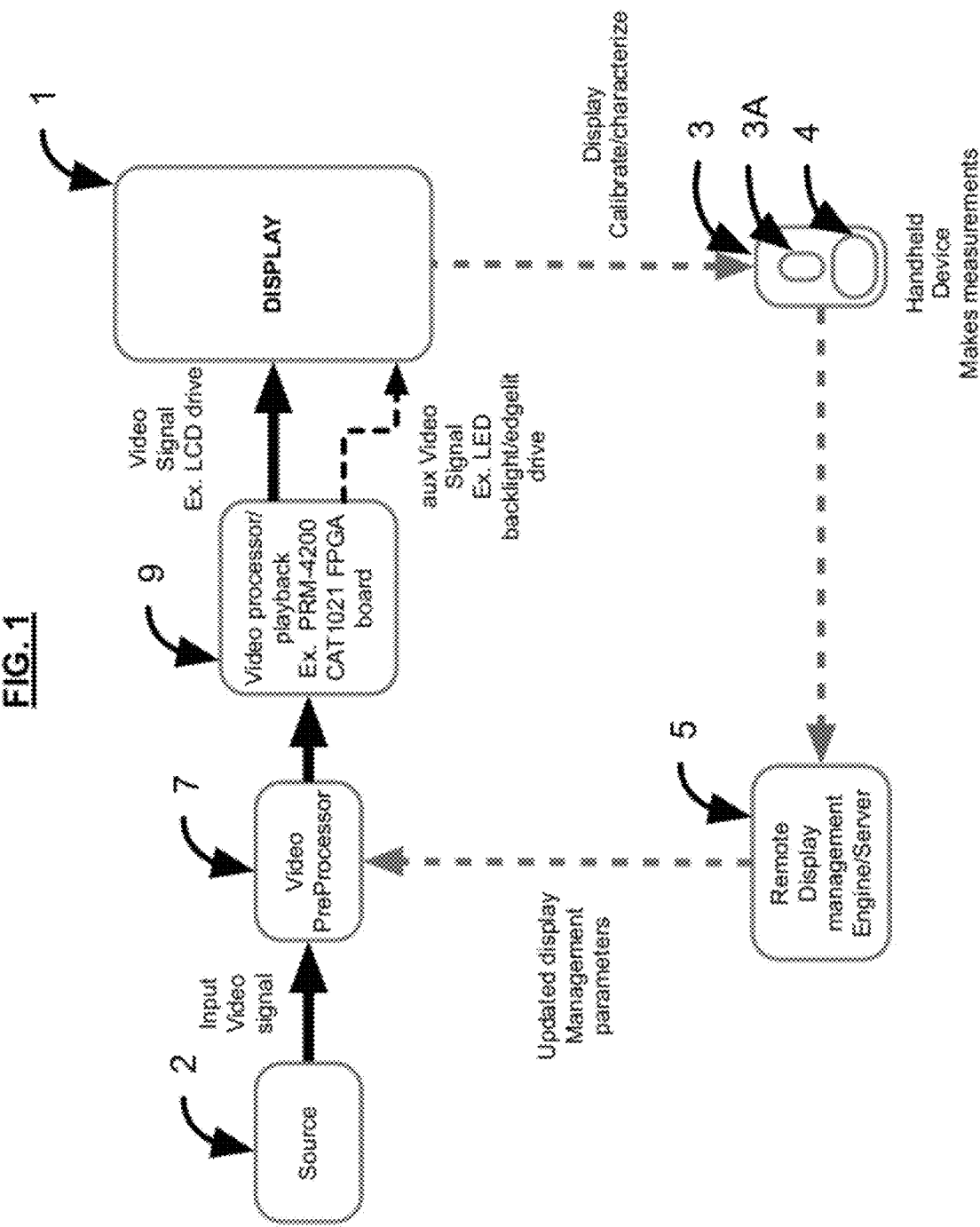
FIG. 1 is a block diagram of an embodiment of a calibration system, as it might relate to all manner of displays.

FIG. 1 is a block diagram of an embodiment of the inventive system. The system of FIG. 1 includes display device 1 configured to display images sequentially in response to a video input signal from source 2. Display device 1 may be implemented as any of a variety of display devices, (e.g., a standard LCD display, a high contrast LCD display, or another display device). For example, in a class of implementations, device 1 is an LED or LCD display including a front panel (comprising an array of LCD or LED pixels) and a backlighting (or edge-lighting) system for illuminating the pixels of the front panel. A backlighting system typically includes a backlight panel comprising an array of individually controllable LEDs. An edge-lighting system typically includes individually controllable LEDs arranged along edges of a front panel, and a subsystem which directs light from these LEDS to the pixels of the front panel.

Video processor 9 is coupled to assert a video signal to display device 1 for driving the pixels of display device 1, and in cases in which display device 1 includes a backlighting or edge-lighting system, to assert an auxiliary video signal to display device 1 for driving device 1's backlighting or edge-lighting elements.

Video preprocessor 7 is coupled and configured to receive a video input signal from source 2, to perform preprocessing thereon, and to assert the preprocessed video signal to video processor 9.

Elements 1, 7, and 9 of the FIG. 1 system can be implemented as subsystems of a single display device, or elements 7 and 9 can be implemented in (or as) a single device distinct from but coupled to display device 1. Typically however, elements 1 and 9 of the FIG. 1 system are implemented as subsystems of a single display device, and preprocessor 7 is implemented a device distinct from this display device, but whose outputs are coupled (e.g., by a cable) to inputs of the display device. Thus, preprocessor 7 can be used in accordance with the invention to calibrate (e.g., recalibrate) a display device comprising elements 1 and 9, or preprocessor 7 can be omitted (e.g., if a user does not desire to calibrate a display device comprising elements 1 and 9 in accordance with the invention).

Device 3 of FIG. 1 includes camera 3A, and processor 4 coupled to receive the output of camera 3A. Typically, device 3 is a camera device as defined above. The camera device is a handheld camera device in preferred embodiments. Alternatively, device 3 is a handheld device that is not a camera device as defined above.

The FIG. 1 system is preferably configured to use device 3 to capture ambient light changes and characteristics of display device 1 (e.g., contrast settings), and to use device 3, remote server 5 (coupled, during operation, to processor 4 of device 3), and preprocessor 7 to perform tone mapping (mapping of displayed color and brightness values characterizing display device 1 to another set of color and brightness values) dynamically in accordance with an embodiment of the invention.

Server 5 is configured to assert display management parameters to video preprocessor 7 in response to data indicative of measurements of color, contrast and brightness of display device 1 made using device 3. Video preprocessor 7 is operable (coupled and configured) to perform calibration (e.g., recalibration) of display device 1 dynamically, by preprocessing an input video signal for device 1 using the display management parameters from server 5. The calibration typically includes tone mapping.

Measurements of color, contrast and brightness of display device 1 can be made using device 3 in accordance with techniques to be described below. These measurements can be filtered and/or otherwise processed using software (e.g., measurement/acquisition application software) running on processor 4 of device 3. In operation, processor 4 is coupled with remote server 5 (e.g., over the internet or another network) and the output of device 3 is forwarded to server 5. In response to the output of device 3 (indicative of a set of values measured by camera 3A of device 3), server 5 generates a new (updated) set of control parameters for video preprocessor 7. Server 5 sends each set of preprocessor control parameters to preprocessor 7 (e.g., over the internet or another network).

Device 3 is typically an inexpensive, handheld camera device whose camera 3A is an inexpensive camera whose sensitivity function is unknown a priori (i.e., before performance of the inventive method) although its sensitivity function may be determined during performance of embodiments of the inventive method in a manner to be described below. Device 3 is operable (in accordance with embodiments of the invention) to measure light emitted by display 1 in a manner emulating at least one measurement (e.g., measurements) by a calibrated reference camera having a known sensitivity function (e.g., an expensive, highly calibrated imaging colorimeter). Processor 4 of device 3 is coupled and configured to receive raw output from camera 3A and to perform at least some processing on the raw output to generate measurement data to be provided to server 5.

Preprocessor 7 can be configured to implement any of a variety of tone mapping algorithms to process the input video data asserted thereto, to accomplish calibration (e.g., recalibration) of display device 1. Each set of preprocessor control parameters generated by server 5 has content and format so as to be useful by preprocessor 7 to implement the appropriate tone mapping algorithm.

For example, preprocessor 7 may implement a conventional tone mapping algorithm of a type known as the Reinhard Tone Mapping Operator ("RTMO"). The RTMO is described in, for example, the paper entitled "Photographic Tone Reproduction for Digital Images," by Erik Reinhard, Mike Stark, Peter Shirley and Jim Ferwerda, ACM Transactions on Graphics, 21(3), July 2002 (Proceedings of SIGGRAPH 2002).

Some conventional tone mapping algorithms (e.g., the above-mentioned RTMO algorithm) map the range of colors and brightness from scene referred content to the dynamic range and color of a display device. They typically generate a set of N tone mapped output luminance values (one for each of N pixels to be displayed) in response to a set of N input luminance values (one for each pixel of an input image), using values indicative of the maximum luminance that can be displayed by the display device and the display contrast (or the maximum and minimum luminances that can be displayed by the display device), the average luminance of the pixels of the input image (sometimes referred to as "scene luminance"), the luminance of an input image pixel that is to be mapped to the middle of the range of luminance values displayable by the display device, and a threshold input image pixel luminance value above which each input pixel is to be mapped to the maximum luminance that can be displayed by the display device.

To generate a set of preprocessor control parameters for use by preprocessor 7 to implement such a conventional tone mapping algorithm to calibrate display 1, server 5 is typically configured to process data from device 3 that are indicative of the following values: ambient brightness (e.g., determined from measurements using camera 3A of the brightness of display 1's surrounding environment, useful to correct measurements by camera 3A of light emitted from display 1 during test image display), the luminance of the brightest white emitted by display 1 while displaying at least one test image, and the contrast of display (which in turn determines the luminance of the darkest black emitted by display 1 while displaying relevant test image(s)).

The preprocessor control parameters generated by server 5 are feedback indicative of measurements by device 3 of light emitted from display 1 (typically during display of at least one test pattern). Elements 3, 5, and 7 of FIG. 1 are thus a feedback subsystem of the FIG. 1 system, coupled and configured to generate preprocessor control parameters automatically in response to measurement data (indicative of measurements by device 3) and to assert preprocessor control parameters from server 5 as calibration feedback to video preprocessor 7. Video preprocessor 7 is operable (coupled and configured) to calibrate (e.g., recalibrate) display 1 in response to the control parameters by filtering input image data (e.g., input video data) to be displayed (e.g., to automatically and dynamically correct for variations in calibration of the display).

In variations on the FIG. 1 embodiment, preprocessor control parameters are generated automatically by a camera or handheld device (e.g., device 3) alone, rather than by a camera or handheld device in combination with a remote display management server (e.g., server 5). In operation of the FIG. 1 system, processor 4 of device 3 is coupled and configured (e.g., programmed with software) to generate measurement data and send the measurement data to remote server 5, and remote server 5 is configured to generate preprocessor control parameters automatically in response to the measurement data. In variations on the FIG. 1 embodiment, a camera device includes a processor coupled and configured (e.g., programmed with software) to generate identical or similar measurement data, to generate preprocessor control parameters in response to the measurement data, and to send (e.g., over the internet or another network) the preprocessor control parameters to a video preprocessor (e.g., preprocessor 7).

To generate a set of preprocessor control parameters for use by preprocessor 7 to implement color calibration of display device 1, server 5 is configured to process data from device 3 that are indicative of light emitted by device 1 in response to a test image (or sequence of test images) indicative of primary colors (e.g., primaries of a standard color space such as Dcinema P3, REC709, or REC601, for example) and at least one white point (e.g., a standard white point such as the well known D65 or D63 white point, for example).

Preferably, preprocessor 7 performs all three of color, contrast, and dynamic range calibration of display device 1, and server 5 generates the required preprocessor control parameters for causing preprocessor 7 to do so. To allow contrast and dynamic range color calibration, test patterns to be described below are preferably asserted to display device 1 for display.

Preferably (e.g., in cases in which display device 1 is configured to implement a dynamic reference mode for luminance), the test patterns displayed by display device 1 during measurements by device 3 (i.e., test patterns for color, contrast, and dynamic range calibration of display device 1) are selected so that the luminance levels of the light emitted by display device 1 in response to the test patterns are low enough to avoid saturating the sensors of device 3's camera 3A at a particular exposure setting.

We next describe color calibration of display device 1 (in accordance with an embodiment of the inventive method) in more detail. FIG. 7 is a chart of quantities generated or used, and steps performed, in this embodiment of the inventive method.

In a preliminary display characterizing operation (preliminary to color calibration of display 1 using device 3, implemented as a camera device, in accordance with the invention), a reference camera (e.g., reference CCD camera) which is precalibrated in the sense that it has a known sensitivity function, $f_c(\lambda)$, where "$\lambda$" denote wavelength, is used to measure the output of display 1, $f_D(\lambda)$, as a function of wavelength in response to each test color and white point determined by at least one test pattern. The test pattern(s) are indicative of primary colors (e.g., primaries of a standard color space) and at least one white point (e.g., a standard white point).

This operation determines $f_T(\lambda)=f_D(\lambda)/f_c(\lambda)$, which is the transfer function that matches the display response (for each test color and white point) to the reference camera response. For each test color and white point, a set of values $f_T(\lambda)=f_D(\lambda)/f_c(\lambda)$, and a set of the reference camera sensitivity values $f_c(\lambda)$, for each of a set of wavelengths, $\lambda$, are stored for later provision (e.g., downloading over the internet or another network) to device 3. These values are indicated as "stored information" in FIG. 7.

Then (at some "initial" time, denoted as time "T0" in FIG. 7), device 3 (e.g., implemented as a handheld camera device including an inexpensive, uncalibrated camera 3A) is employed to characterize display device 1. Camera 3A of device 3 has a sensitivity function, $f'_c(\lambda)$ that can be (and typically is) unknown a priori (at the start of the preliminary display characterizing operation). At the initial time, camera 3A measures the output, $f'_D(\lambda)$, of display device 1 in response to the same test colors and white point (e.g., in response to the same displayed test pattern(s) employed in the preliminary display characterizing operation) for each of the set of wavelengths, $\lambda$. The previously determined values $f_T(\lambda)=f_D(\lambda)/f_c(\lambda)$, and $f_c(\lambda)$, for each of the wavelengths are provided (e.g., downloaded over the internet from the manufacturer of device 1 or 3) to processor 4 of device 3. Programmed processor 4 operates to determine $f'_c(\lambda)=(f'_D(\lambda)/f_D(\lambda))*(f_c(\lambda))=f'_D(\lambda)/(f_D(\lambda)/f_c(\lambda))$, which is the camera sensitivity function of camera 3A, from the measured $f'_D(\lambda)$ values and the provided $f_D(\lambda)/(f_c(\lambda))$ values.

The determined $f'_c(\lambda)$ values (and typically also the $f'_D(\lambda)$ values) are stored in memory (associated with processor 4) in device 3. Then, some later time (denoted as time "T1" in FIG. 7) in order to recalibrate display device 1 (e.g., to match its setting at the initial time), device 3 is again used to measure the output of display device 1, $f''_D(\lambda)$, in response to each test color and white point. Using the measured $f''_D(\lambda)$ values and the stored $f_c(\lambda)$ and $f'_c(\lambda)$ values, device 3 determines $f'''_D(\lambda)=(f_c(\lambda)/f'_c(\lambda))*f''_D(\lambda)$, for each of the wavelengths, which is the display response function (at the time T1) that would have been measured using the calibrated reference camera rather than camera 3A. The $f'''_D(\lambda)$ values are sent to remote server 5, for use in generating preprocessor control parameters for use by preprocessor 7 to recalibrate display 1.

In typical implementations, server 5 of the FIG. 1 system is programmed to use the $f'''_D(\lambda)$ values to generate (and send to preprocessor 7) an updated set of preprocessor control parameters for recalibration of display 1, e.g., to recalibrate display 1 to match a target profile. The target profile can be, but is not necessarily, an initial profile of display 1 (e.g. an initial profile determined at the factory). Alternatively, the target profile is a profile of another display device, in which case the inventive method provides a way to match display 1's profile to that of the other display device. More generally, it should be appreciated that the calibration techniques described herein are useful for performing display matching in a manner different from conventional display matching techniques.

In some embodiments, processor 4 of device 3 determines difference values $d_D(\lambda)=(f_c(\lambda)/f'_c(\lambda))*(f''_D(\lambda)-f'_D(\lambda))$, using the measured $f''_D(\lambda)$ values and the stored $f_c(\lambda)$, $f'_c(\lambda)$, and $f'_D(\lambda)$ values, for each of the wavelengths. The function $d_D(\lambda)$ is the difference between the display response function at the time T1 and the display response function at the initial time, that would have been measured using the calibrated reference camera rather than camera 3A. The difference values $d_D(\lambda)$ values may be sent to remote server 5, for use by server 5 to generate (and send to preprocessor 7) an updated set of preprocessor control parameters for use by preprocessor 7 to recalibrate display 1 to match its settings at the initial time.

Video preprocessor 7 can thus be used to realign the primaries of light emitted by display device 1 to a set of expected primaries, based on misalignment measurements captured by the device 3.

We next describe contrast and dynamic range calibration of display device 1 in more detail.

Figure 4B:
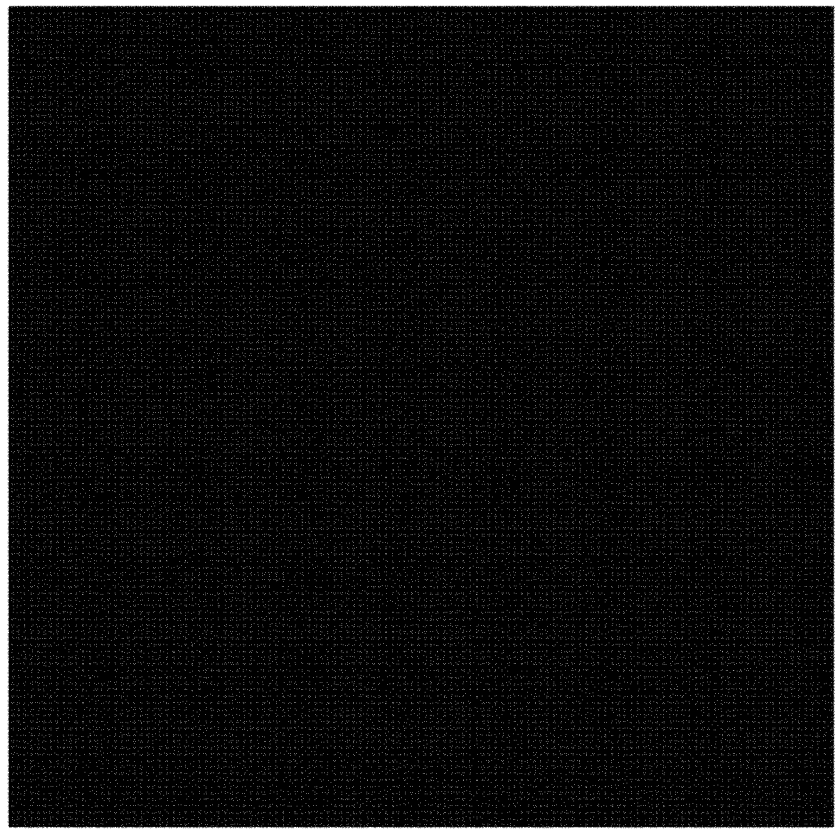
FIG. 4B is a diagram of the Fast Fourier Transform (normalized 2D FFT magnitudes) of the pattern of FIG. 4A.
Figure 4A:
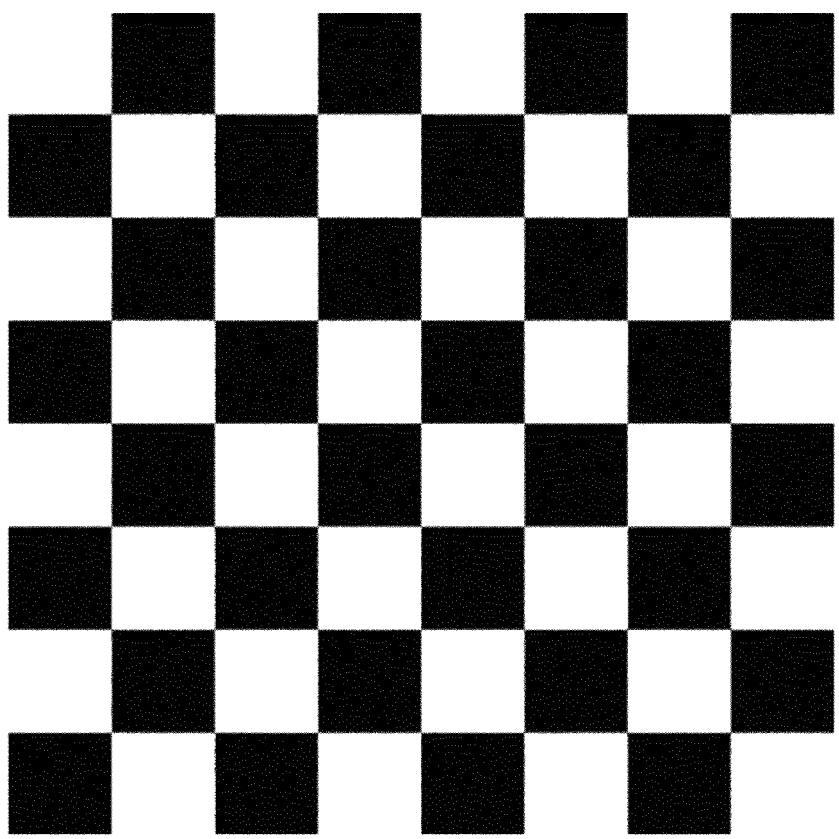
FIG. 4A is a diagram of a uniform checkerboard test pattern.

Contrast ratio can be defined as the ratio of emitted light intensity when displaying a white field to emitted light intensity when displaying a black field. It is often desirable to measure "local" contrast of a display by determining one or more "local" contrast ratios, each of which is a contrast ratio in a different local region (at a specific spatial position) within a displayed image. Contrast ratio determined using a single test pattern having dark (black) and white fields is sometimes referred to as "intra-frame" contrast ratio. Intra-frame contrast ratio is typically measured conventionally using a checkerboard test pattern comprising rectangular white and dark (black) fields in a checkerboard arrangement (e.g., a uniform checkerboard pattern as shown in FIG. 4A).

To perform contrast calibration using the FIG. 1 system in accordance with some embodiments of the inventive method, local contrast of display device 1 is measured as follows using device 3. Device 3 senses the image displayed by display device 1 in response to a checkerboard test pattern that is non-uniform (in the sense that the size of its individual fields varies with spatial position in the displayed image), to determine local (intra-frame) contrast as a function of spatial position in the displayed image. Typically, processor 4 of device 3 executes application software that recognizes location within the displayed image by recognizing a feature size (e.g., the size of the "fields" or "boxes" in a local region of the checkerboard pattern of FIG. 2, 3, 5A, or 6A) associated with each location, and determines contrast at each of one or more locations. The resolution (feature size) at which the fields of uniform checkerboard pattern become flat (the minimum resolvable displayed feature size of the test pattern's features) can readily and efficiently be determined.

In preferred embodiments, camera 3A senses the image displayed by display device 1 in response to a non-uniform test pattern having features of many different sizes (e.g., the pattern of FIG. 2, FIG. 3, FIG. 5A, or FIG. 6A), in which the feature size varies with spatial location (e.g., along linear paths across the pattern) in a well-defined manner. An example of a preferred, non-uniform checkerboard test pattern suitable for this operation is the pattern shown in FIG. 2 (or FIG. 5A). The FIG. 2 pattern has a rectangular outer border, and the size of each field (block) thereof increases with increasing radial distance from the center of the pattern. Another example of a preferred non-uniform checkerboard test pattern suitable for this operation is the dyadic grid pattern shown in FIG. 3. The FIG. 3 pattern also has a rectangular outer border, and the size of each field (block) thereof increases with increasing distance from one outer corner of the pattern. With the non-uniform test pattern of FIG. 2, FIG. 3, FIG. 5A, or FIG. 6A (or a similar non-uniform checkerboard pattern), at the spatial location in the displayed image corresponding to a particular feature size, the checkerboard morphs into a flat color (grey). This indicates the limitation of the intra-frame contrast on the image. Measurement of this value is particularly useful in measuring the intraframe contrast of modulated LED backlit and edgelit display systems where the local contrast is limited by the spacing of the LEDs relative to the LCD pixels.

In alternative embodiments, a sequence of uniform checkerboard test patterns (each of which is uniform across the display screen in the sense that it is a checkerboard pattern with uniform block size) could be displayed to determine local contrast and minimum resolvable displayed test pattern feature size. This would have the advantage of eliminating the need for exact alignment of camera 3A with display 1 (the camera center point could simply be aligned with any point near the center of a test pattern). However, it would not allow efficient determination of both local (intra-frame) contrast and minimum resolvable displayed test pattern feature size.

Figure 2:
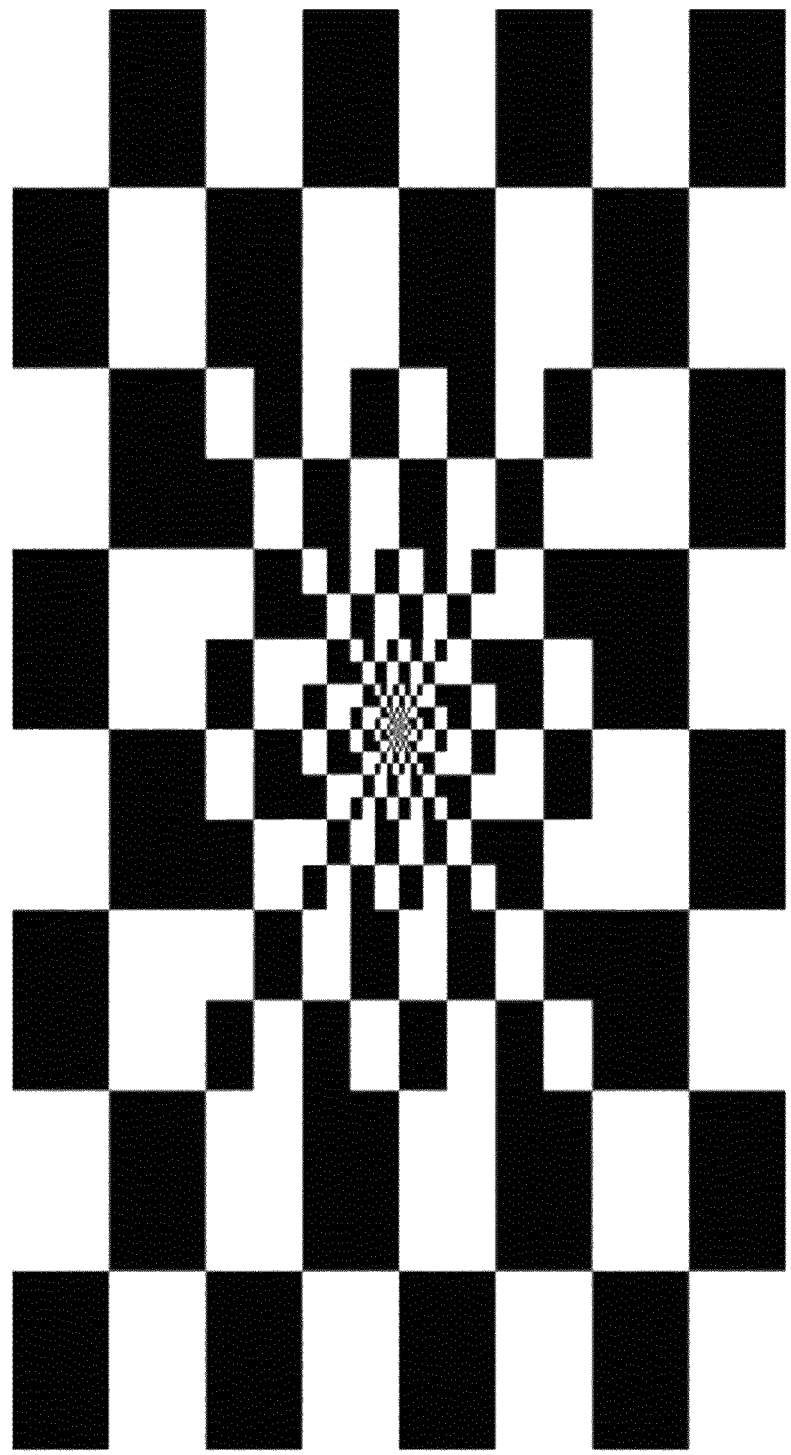
FIG. 2 is a test pattern employed in an embodiment.
Figure 3:
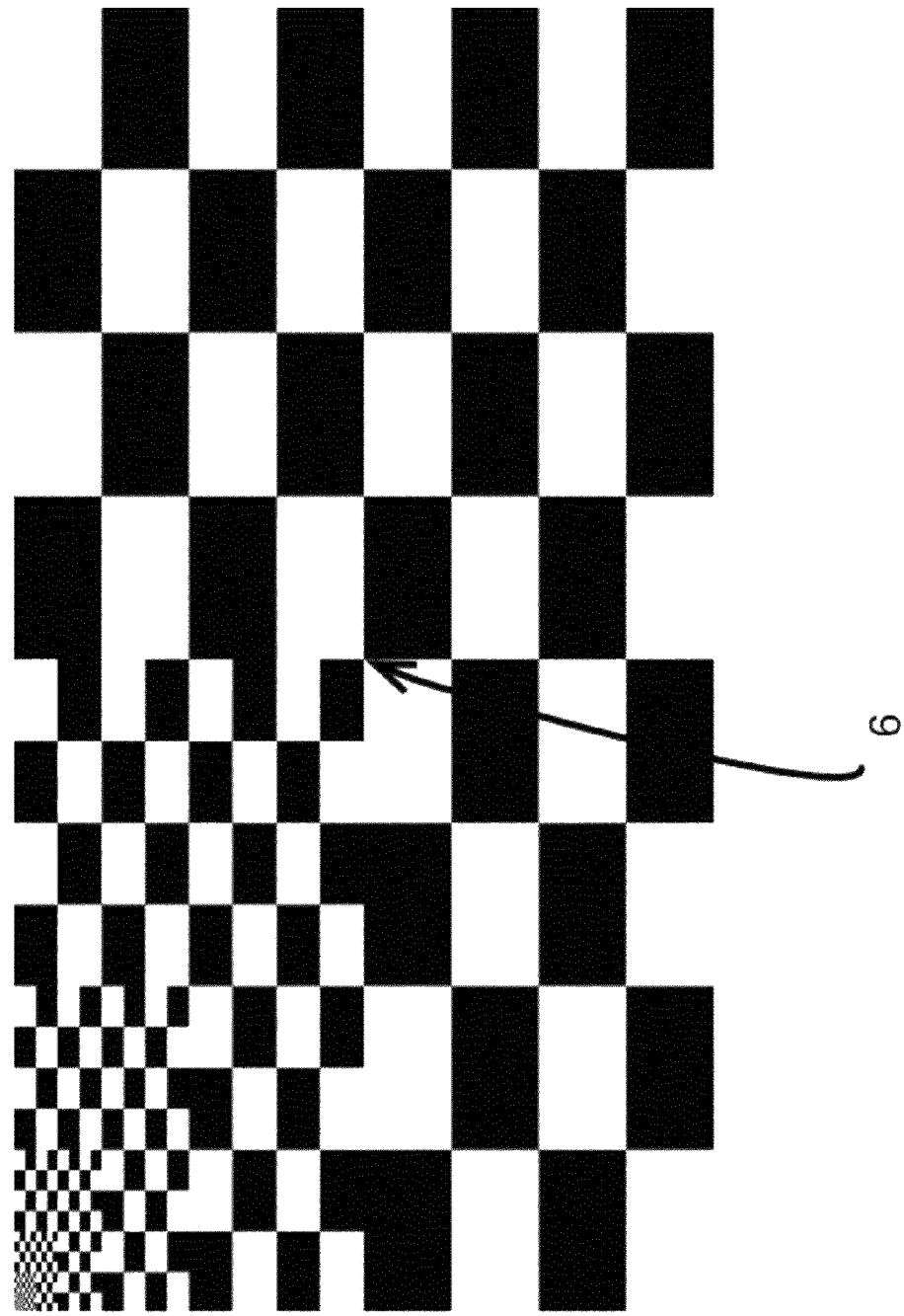
FIG. 3 is a diagram of another test pattern employed in an embodiment.

A non-uniform checkerboard pattern (e.g., as shown in FIG. 2 or 3) can provide an effective measure of local intra-frame contrast. Being two dimensional (in contrast with a pattern consisting of vertical bars), it allows measurement of local contrast variations along both the horizontal and vertical directions in an efficient manner (with reduced time requirement for characterizing such contrast).

Preferably, a single one of the test patterns (e.g., the pattern of FIG. 2 or 3) is displayed by display device 1, and in response device 3 determines a single contrast value (or set of contrast values) and optionally also a value indicative of minimum resolvable displayed feature size. These determined values are then used (e.g., asserted to server 5) with other measured values (determined using other test patterns) to generate an updated set of pre-processor control parameters for preprocessor 7.

The choice as to a preferred test pattern to employ for contrast calibration in a specific implementation of the FIG. 1 system may depend on the ease of alignment of the displayed test pattern with the camera 3A to be employed for the calibration. For example, the FIG. 3 (or FIG. 5A) pattern may be a preferred pattern when camera 3A is a CCD imaging camera, since such a camera may operate in a landscape mode while device 3's processor 4 executes application software to recognize a distinctive pattern in the test pattern (e.g., the distinctive pattern, having features of distinctive size, at center 6 of the FIG. 3 pattern) to facilitate alignment of the center of the displayed test pattern with the center of the camera's CCD array.

It should be appreciated that the uniform checkerboard test pattern of FIG. 4A has a simple Fourier spectrum comprised mainly of odd harmonics of a fundamental, due to its evenly spaced grid-like spatial spectral structure. FIG. 4B is a diagram of the Fast Fourier Transform (normalized 2D FFT magnitudes) of the pattern of FIG. 4A.

Figure 5B:
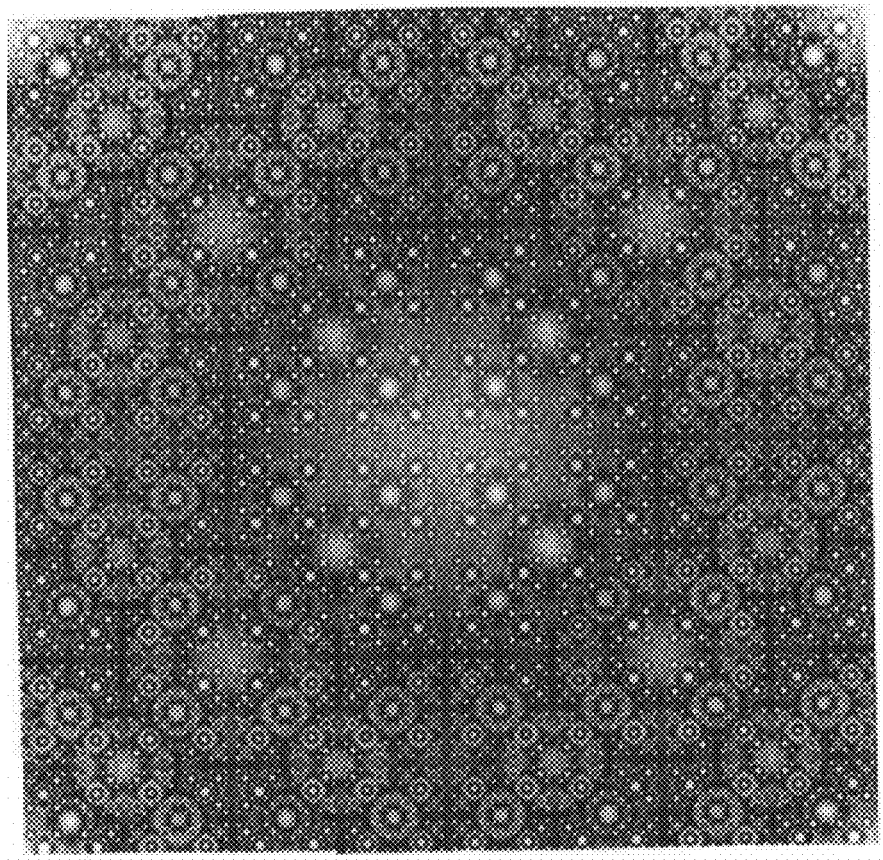
FIG. 5B is a diagram of the Fast Fourier Transform (normalized 2D FFT magnitudes) of the pattern of FIG. 5A.
Figure 5A:
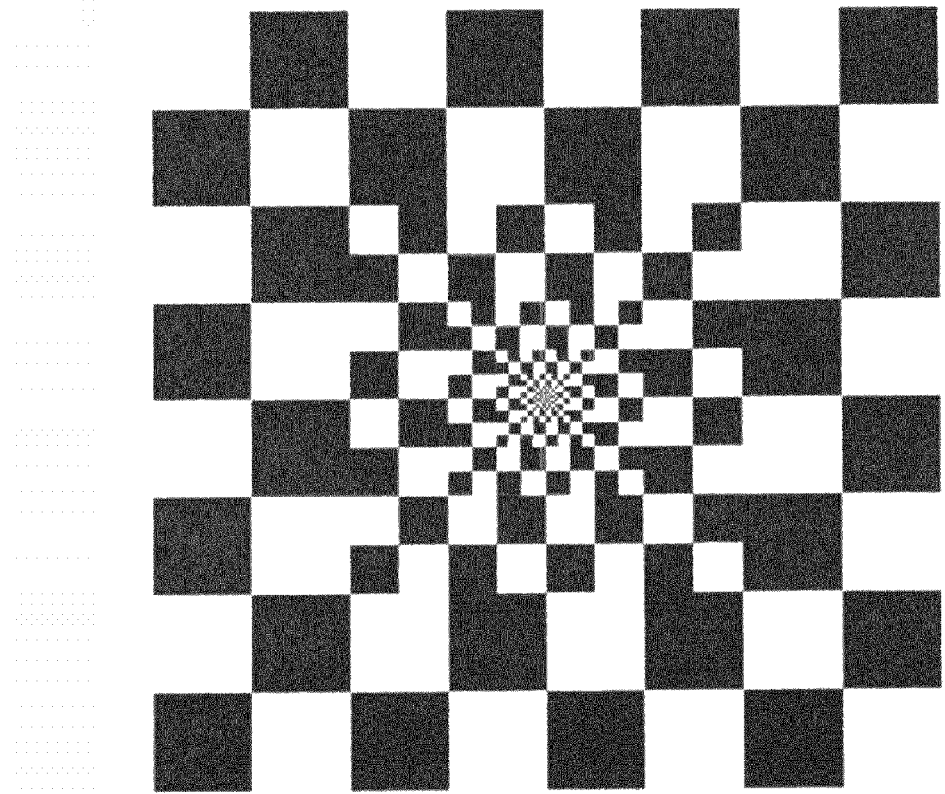
FIG. 5A is a diagram of another test pattern employed in an embodiment.
Figure 6B:
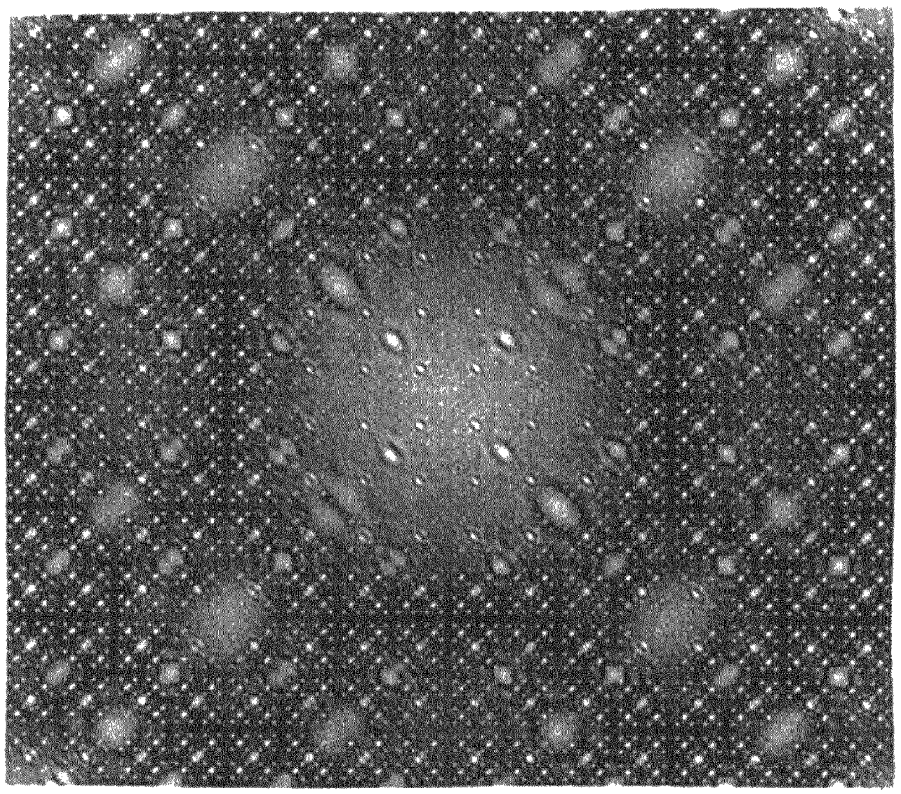
FIG. 6B is a diagram of the Fast Fourier Transform (normalized 2D FFT magnitudes) of the pattern of FIG. 6A.
Figure 6A:
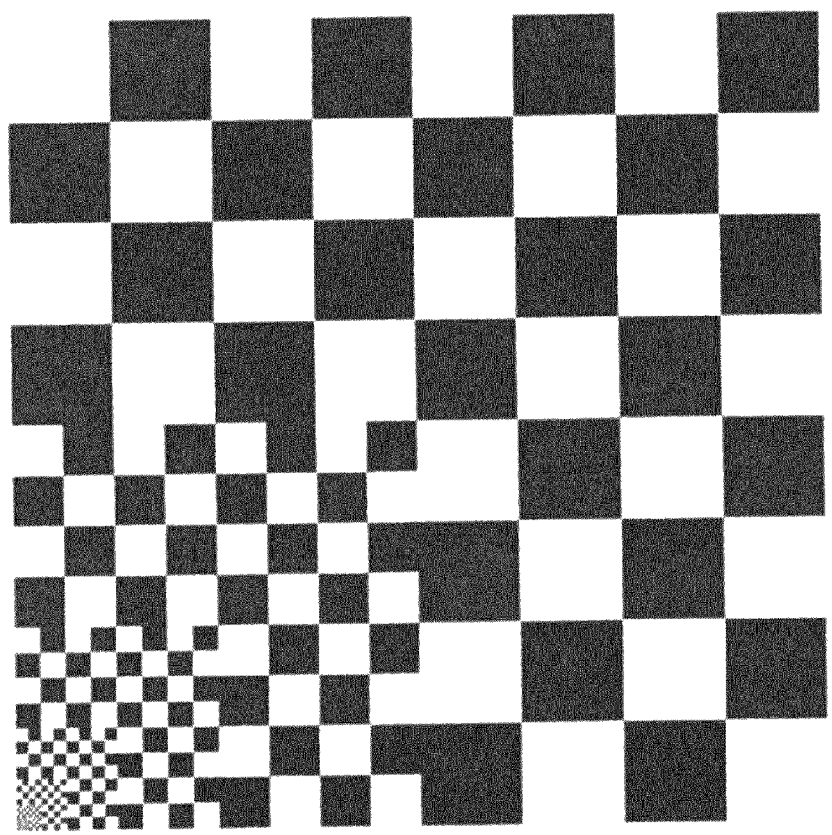
FIG. 6A is a diagram of another test pattern employed in an embodiment.

In contrast, each of FIG. 5A and FIG. 6A is a diagram of a nonuniform checkerboard test pattern employed in an embodiment of the inventive method. FIG. 5B is a diagram of the Fast Fourier Transform (normalized 2D FFT magnitudes) of the pattern of FIG. 5A, and FIG. 6B is a diagram of the Fast Fourier Transform (normalized 2D FFT magnitudes) of the pattern of FIG. 6A. As apparent from FIG. 5B (or 6B), the FIG. 5A (or 6B) pattern has a more complex Fourier spectrum than does the FIG. 4A pattern, due to the varying sizes of its rectangular features. The FIG. 5A (or 6A) pattern is a good example of a structurally simple spatial pattern (useful as a test pattern in some embodiments of the invention) that demonstrates complex spatial transform domain characteristics.

A camera's dynamic range is the ratio of the maximum and minimum light intensities measurable by the camera. A display's dynamic range is the ratio of the maximum and minimum light intensities that can be emitted by the display. To perform brightness or dynamic range calibration of display 1 in accordance with some embodiments of the inventive method, the dynamic range relationship between device 3's camera 3A and display 1 is determined as follows.

The minimum light intensity measurable by a camera (e.g., camera 3A) is typically determined by the camera noise at the exposure values employed. Handheld camera devices typically have a limited number of camera exposure settings. Thus, with device 3 implemented as such a typical handheld device, camera noise can be estimated by operating camera 3A to take a few camera images of a black surface. The maximum light intensity measurable by camera 3A (the high end of the camera's dynamic range) is determined by the measured intensity at which the sensors (e.g., CCDs) in camera 3A start to saturate. To measure the intensity at which the sensors (e.g., CCDs) in camera 3A start to saturate, camera 3A can be operated to image a black and white test pattern displayed by display device 1 (preferably, with display device 1 implemented as a high dynamic range or "HDR" display device) having a range of emitted brightness values at different spatial locations. Preferably, the test pattern is such that the emitted brightness increases with increasing distance from a specific spatial location of the displayed image. For example, the test pattern can be checkerboard pattern or VESA box (comprising a pattern of white and black features) whose ratio of total white feature area to total black feature area in a local region increases (continuously or stepwise) with increasing distance from a specific spatial location on the test pattern. Alternatively, the test pattern can be a grey ramp with coarse levels (for example, 16 vertically arranged grey levels). By displaying such a test pattern with brightness so as not to saturate any sensor in camera 3A that receives light emitted from any spatial location of the displayed image, display 1's dynamic range can be estimated by extrapolating the steps in the camera response given knowledge of the displayed brightness as a function of spatial location of the displayed pattern.

During measurements by device 3, display device 1 can be caused to display test patterns in any of a variety of different ways. For example, device 3 can send them directly to preprocessor 7 or processor 9 as input image data. Or, input video indicative of a sequence of the test patterns can be sent from a source to display device 1 (e.g., from source 2 or server 5 to preprocessor 7 or processor 9 as input image data, and from there to device 1, or from preprocessor 7 or processor 9 to device 1) in response to a command from device 3. The command is optionally relayed from device 3 to the test pattern source through a remote server (e.g., server 5 of FIG. 1, in the case that server 5 is not itself the test pattern source).

In some implementations of the FIG. 1 system, remote server 5 is coupled during performance of the inventive method via the internet (or another network) to device 3. Remote server 5 could be operated by an entity which rents server 5 (to the user of device 3) for executing calibration software to generate preprocessor control parameters in response to the output of device 3 (e.g., remote server 5 could reside on the Amazon Elastic Compute Cloud, sometimes referred to as the "EC2 cloud," or another cloud computing system).

In some embodiments, remote server 5 is configured to be operable in response to output from device 3 to re-render input video (or other input content) that is tone mapped for a specific display device (i.e., device 1) using control parameters determined from the output of device 3, and to feed the re-rendered content to video preprocessor 7 (or directly to processor 9).

In some implementations of the FIG. 1 system, the preprocessor control parameters generated by server 5 are used by preprocessor 7 to correct for display non-uniformities. Such preprocessor control parameters could be generated by server 5 using a display uniformity mask generated by device 3, or could be determined by device 3 using such a display uniformity mask and sent directly from device 3 to video preprocessor 7.

In some embodiments of the invention (e.g., in some implementations of the FIG. 1 system), control parameters for use by a preprocessor to calibrate a display (e.g., control parameters generated by remote server 5) are inserted in blanking intervals of an input video stream. This could be done by the source of the input video (e.g., source 2 of FIG. 1) in response to preprocessor control parameters received from server 5. Preprocessor 7 could be configured to extract the preprocessor control parameters from the blanking intervals and to use the extracted parameters to determine preprocessing to be applied to the input video to implement calibration of display 1.

In some embodiments, the inventive system is configured to perform global contrast characterization of a display device. One such system is that of FIG. 3A, in which elements 1, 3, and 9 are identical to elements 1, 3, and 9 of FIG. 1. The FIG. 3A system is configured to make (or allow a user to make) inferences regarding the global dynamic range of display device 1. In the FIG. 3A system, processor 4 of camera device 3 has access to raw CCD pixel values generated by camera 3A. Processor 9 is fed with a ramp input (test image E1) whose luminance increases linearly along the width of the display screen when displayed by device 1. Image E2 is the actual output of display 1 in response to image E1, as measured by a calibrated imaging colorimeter (which is not part of the inventive system) whose dynamic range is wider than that of display device 1. Image E2 is saturated along the top end (at high luminances) and clipped at the bottom end (at low luminances) due to the inherent dynamic range limitations of the display circuitry (input dynamic range) and the display optics (display dynamic range). Image E3 is the output of display device in response to image E1, as measured using camera device 3. Image E3 differs from the response (image E2) of display 1 due to dynamic range mismatch between display 1 and camera 3A. By knowing the dynamic range relationship or transfer function between display 1 and camera 3A at an initial time, processor 4 can estimate the global contrast of display 1 at a later time. This can be fed back to processor 9 (or to a video preprocessor coupled to the input of processor 9) for auto recalibration of display device 1.

Given knowledge of the EOTF (Electro-Optical Transfer Function) of display device 1, the luminance of light emitted by display device 1 in response to a particular input signal codeword can be predicted accurately. Hence, given the response of camera 3A at a particular luminance (lower than the maximum luminance) and the EOTF of display device 1, the response of camera 3A in the camera's saturated range can be estimated very effectively. Such estimates are employed in some embodiments of the inventive method.

For a particular camera device (for example, device 3 implemented as a handheld camera device), it is contemplated that reference data indicative of color matching and/or color response functions (e.g., the above-mentioned reference camera sensitivity function $f_c(\lambda)$, and display response $f_D(\lambda)$) for a particular display can be packaged (e.g., by the manufacturer) into a file readable by the camera device (e.g., a file in a format compatible with the well known "extensible markup language" or XML). In order to recalibrate the color or contrast of a display, a user could load the reference data and appropriate application software into a camera device. While executing the software, the camera device would then make necessary measurements of light emitted by the display, and compare them against corresponding values of the reference data for the measured display, and preferably also determine difference values indicative of the differences between the measured values and corresponding reference data values.

For example, at a time T1, using reference data indicative of a reference camera sensitivity function $f_c(\lambda)$, and display response $f_D(\lambda)$ previously generated using the reference camera, device 3 could determine values $f'_c(\lambda)=f'_D(\lambda)/(f_D(\lambda)/f_c(\lambda))$ indicative of the sensitivity function of the device's camera 3A, and values indicative of display response function $f'''_D(\lambda)=(f_c(\lambda)/f'_c(\lambda))*f''_D(\lambda)$, which is the response function of display 1 at the time T1 that would have been measured using the reference camera used to generate the previously determined display response $f_D(\lambda)$, where $f''_D(\lambda)$ is the response function of display 1 at the time T1 measured using camera 3A of device 3. Processor 4 of device 3 could then compute difference values $\Delta_D(\lambda)=(f'''_D(\lambda)-f_D(\lambda))$, for each of a set of measured wavelengths. The difference values are indicative of changes in characteristics of display 1 since its original calibration using the reference camera, and would then be used to recalibrate the display (e.g., the difference values are sent from device 3 of FIG. 1 to remote server 5, which generates video preprocessor control parameters in response thereto and sends the video preprocessor control parameters to video preprocessor 7 which uses them to recalibrate display 1). More generally, the difference values can be used for one or more of the following operations: auto-recalibration of a display; and feedback preprocessing of input image data (to be displayed by a display) for accurate display management.

It should be appreciated that raw data from the camera sensor(s) of the camera device employed in preferred embodiments of the invention (e.g., raw CCD image data from a camera including a CCD sensor array), or a minimally processed version of such raw data, is accessible and actually processed in accordance with such embodiments to achieve accurate implementation of display calibration and/or characterization.

It should also be appreciated that the techniques described herein can be used for accurate representation of nonlinear variations in parameters or characteristics of a display device. For example, determination of a display's response function as a function of frequency over a range of frequencies (e.g., the full range of frequencies in the visible spectrum) can allow nonlinear compensation for nonlinear variations, whereas determining the display's response at each of a small number of frequencies (e.g., one each in the red, green, and blue ranges) would not allow such compensation for nonlinear variations. By making transformations based on the full spectrum of a display, it is possible to achieve more accurate calibration of the display than could be achieved by simple linear operators, e.g., color rotation matrices.

In some embodiments, at least one of the camera or handheld device (e.g., device 3 of FIG. 1), remote server (e.g., server 5 of FIG. 1), and video preprocessor (e.g., preprocessor 7 of FIG. 1) of the inventive system is or includes a field-programmable gate array (FPGA), or other integrated circuit or chip set, programmed and/or otherwise configured to perform steps of an embodiment of the inventive method in response to data asserted thereto). In some embodiments, at least one of the camera or handheld device (e.g., processor 4 of device 3 of FIG. 1), remote server (e.g., server 5 of FIG. 1), and video preprocessor (e.g., preprocessor 7 of FIG. 1) of the inventive system is or includes a programmable digital signal processor (DSP) programmed and/or otherwise configured to perform pipelined processing, including steps of an embodiment of the inventive method, on data. Alternatively, at least one of the camera device (e.g., processor 4 of device 3 of FIG. 1), remote server (e.g., server 5 of FIG. 1), and video preprocessor (e.g., preprocessor 7 of FIG. 1) of the inventive system is or includes a programmable general purpose processor (e.g., a PC or other computer system or microprocessor) coupled to receive or to generate input data, and programmed with software or firmware and/or otherwise configured (e.g., in response to control data) to perform any of a variety of operations on the input data, including steps of an embodiment of the inventive method. For example, at least one of the camera device (e.g., processor 4 of device 3 of FIG. 1), remote server (e.g., server 5 of FIG. 1), and video preprocessor (e.g., preprocessor 7 of FIG. 1) of the inventive system may be or include a computer system (e.g., a PC) including an input device, a memory, and a graphics card that has been appropriately programmed (and/or otherwise configured) to perform steps of an embodiment of the inventive method in response to input data asserted thereto. The graphics card may include a graphics processing unit (GPU), or set of GPUs, dedicated for processing image data and configured to perform the relevant steps of an embodiment of the inventive method. A general purpose processor (or FPGA) configured to perform steps of an embodiment of the inventive method would typically be coupled to an input device (e.g., a mouse and/or a keyboard), a memory, and a display device.

Embodiments for Direct-View LCD Displays

FIG. 8 is a block diagram of an exemplary system which embodies the invention. The display device of FIG. 8 includes front LCD panel 1B, and zonal edge-lit backlight unit 1A ("subsystem" 1A) positioned behind front panel 1B. Subsystem 1A (which may be implemented as described in U.S. patent application Ser. No. 12/882,825, filed on Sep. 15, 2010) includes individually controllable LEDs arranged along edges of a display panel, and a subsystem which directs light from these LEDS to zones of pixels of subsystem 1A's display panel. The full text and disclosure of U.S. patent application Ser. No. 12/882,825 is hereby incorporated herein by reference. Light emitted from subsystem 1A functions to backlight the LCDs of front panel 1B. A processor (not shown) of the display device is coupled and configured to assert a video signal for driving the pixels of panel 1B, and an auxiliary video signal for driving the pixels and edge-lighting elements of subsystem 1A.

In accordance with the invention, camera device 3 of FIG. 8 (which can be identical to camera device 3 of FIG. 1) captures ambient light changes and characteristics of the display device (e.g., contrast settings), and processor 4 of device 3 asserts data indicative of the captured information to a remote server. The remote server comprises LCD drive generator 5B, and edge-lit backlight unit control signal generator 5A. In response to the output of processor 4, generator 5B generates (and asserts to the display device's processor, or to a preprocessor coupled to the inputs of such processor) control parameters for controlling calibration (e.g., recalibration) of panel 1B in accordance with the invention by the display device's processor (or the preprocessor coupled thereto). In response to the output of processor 4, generator 5A generates (and asserts to the display device's processor, or to a preprocessor coupled to the inputs of such processor) control parameters for controlling calibration (e.g., recalibration) of subsystem 1A in accordance with the invention by the display device's processor (or the preprocessor coupled thereto). The calibration control parameters for subsystem 1A can be generated for zones or regions of subsystem 1A's pixels (rather than for individual ones of subsystem 1A's pixels), e.g., by averaging or applying other smoothing functions to calibration control parameters for individual ones of subsystem 1A's pixels and asserting the smoothed or averaged parameters for use in controlling subsystem 1A's edge-lighting elements.

In variations on the FIG. 8 system, the display device is a backlight display with a grid of backlighting LEDs directly behind an LCD front panel (rather than an edge lit backlighting subsystem), and the backlighting LEDs can be controlled (calibrated) in accordance with the invention.

Figure 9:
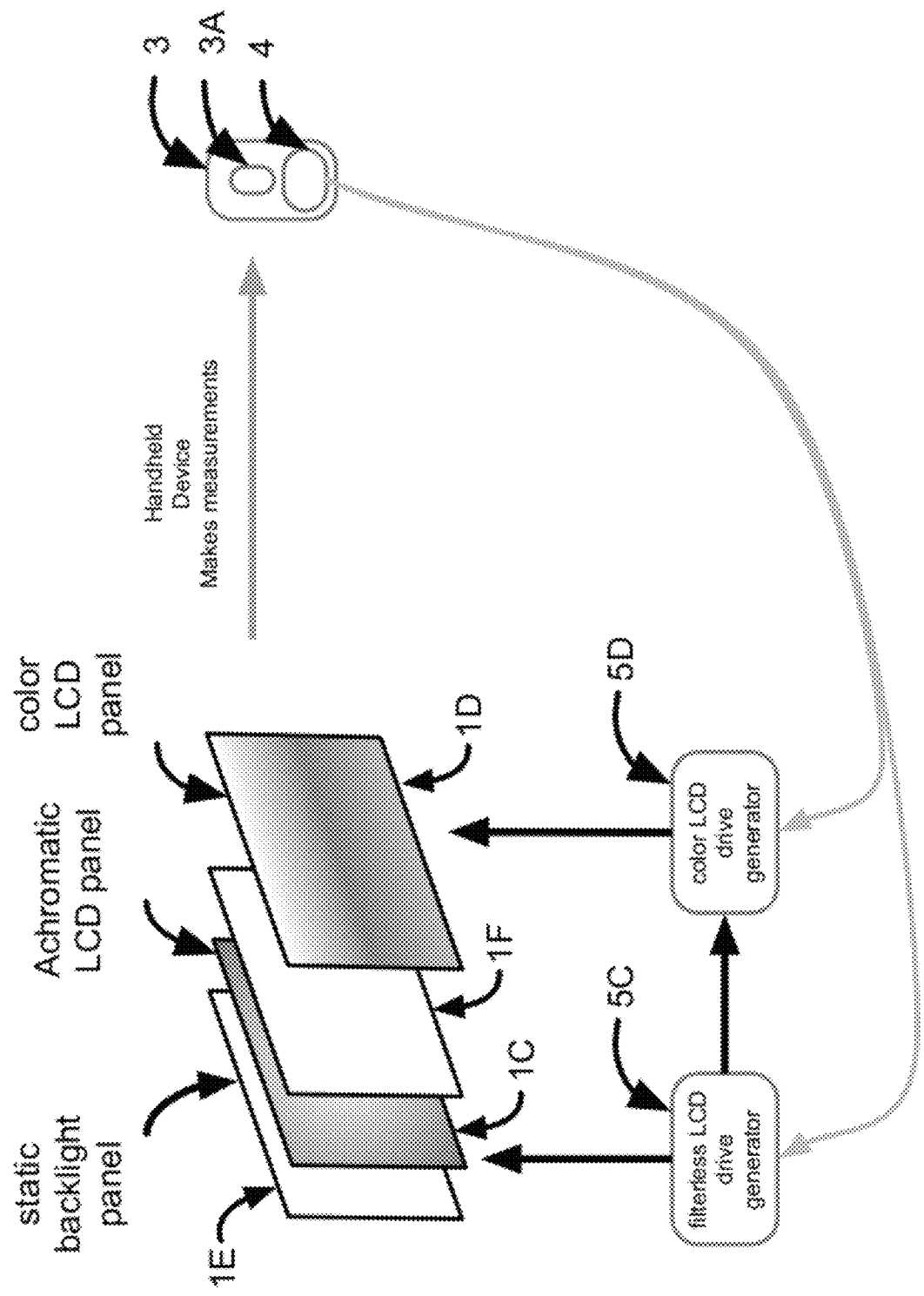
FIG. 9 is a block diagram of another embodiment of a direct view LCD system and calibration.

FIG. 9 is a block diagram of another exemplary system which embodies the invention. The display device of FIG. 9 includes front (color) LCD panel 1D, and a backlighting subsystem positioned behind panel 1D. The backlighting subsystem comprises static backlighting panel 1E, achromatic-.filterless LCD panel 1C in front of panel 1E, and one or more diffuser films 1F between panels 1C and 1D. The backlighting subsystem and local dimming subsystem may be implemented as described in U.S. patent application Ser. No. 12/780,749, filed on May 14, 2010 (the full text and disclosure of U.S. patent application Ser. No. 12/780,749 is hereby incorporated herein by reference). Light emitted from the backlighting subsystem functions to backlight the LCDs of front panel 1D. A processor (not shown) of the display device is coupled and configured to assert a video signal for driving the pixels of panel 1D, and an auxiliary video signal for driving the pixels of panel 1C.

In accordance with the invention, camera device 3 of FIG. 9 (which can be identical to camera device 3 of FIG. 1) captures ambient light changes and characteristics of the display device (e.g., contrast settings), and processor 4 of device 3 asserts data indicative of the captured information to a remote server. The remote server comprises color LCD drive generator 5D, and filterless LCD drive generator 5C. In response to the output of processor 4, generator 5D generates (and asserts to the display device's processor, or to a preprocessor coupled to the inputs of such processor) control parameters for controlling calibration (e.g., recalibration) of panel 1D in accordance with the invention by the display device's processor (or the preprocessor coupled thereto). In response to the output of processor 4, generator 5C generates (and asserts to the display device's processor, or to a preprocessor coupled to the inputs of such processor) control parameters for controlling calibration (e.g., recalibration) of panel 1C in accordance with the invention by the display device's processor (or the preprocessor coupled thereto). The calibration control parameters for panel 1C can be generated for zones or regions of panel 1C's pixels (rather than for individual ones of panel 1C's pixels), e.g., by averaging or applying other smoothing functions to calibration control parameters for individual ones of panel 1C's pixels.

Embodiments for Calibrating 3D Display Systems

The principles of the various embodiments described herein may be extended to 3D display systems of all manners and types. It will now be described, in particular reference to 3D projector display systems, various embodiments for their calibration in similar fashion.

HHD-based calibration methodology may be desirable in managing variations on projection screen gains. Typical digital 3D technologies lose significant amount of light transmission due to filters in light path and 3-D glasses. An exemplary theater has multiple screens, some or all of which may or may not have identical gains, dimensional or geometrical shapes. Since projectors are not necessarily stationary and could be wheeled to different screening rooms in a multiplex, data collected on varied gains may facilitate efficient management of screen-specific configurations. The result may be an efficient mechanism in managing multiple screens of varied amount of reflected light levels, regardless of screen classification, geometrical shapes or projection technologies.

In another embodiment, the HHD-based calibration system may be employed in a circular polarization system and may act as a dynamic seat map generator, identifying seats that are subjected to ghosting or hot-spotting. In this way, affected seats could be blocked out to ensure a premium viewing experience for the patron. With circular polarization, a silver screen is necessary in order to maintain circular polarization and increased level of brightness. The use of the silver screen creates hot spots while reducing the number of seats in the sweet spot. This is due to the limited amount of light generated from the projector in off-axis seating which includes many seats to the leftmost and rightmost of the screen. When 2D content is played back in the same auditorium, the presence of the hot spot results in a poor viewing experience with occupied off-axis seating.

Figure 10:
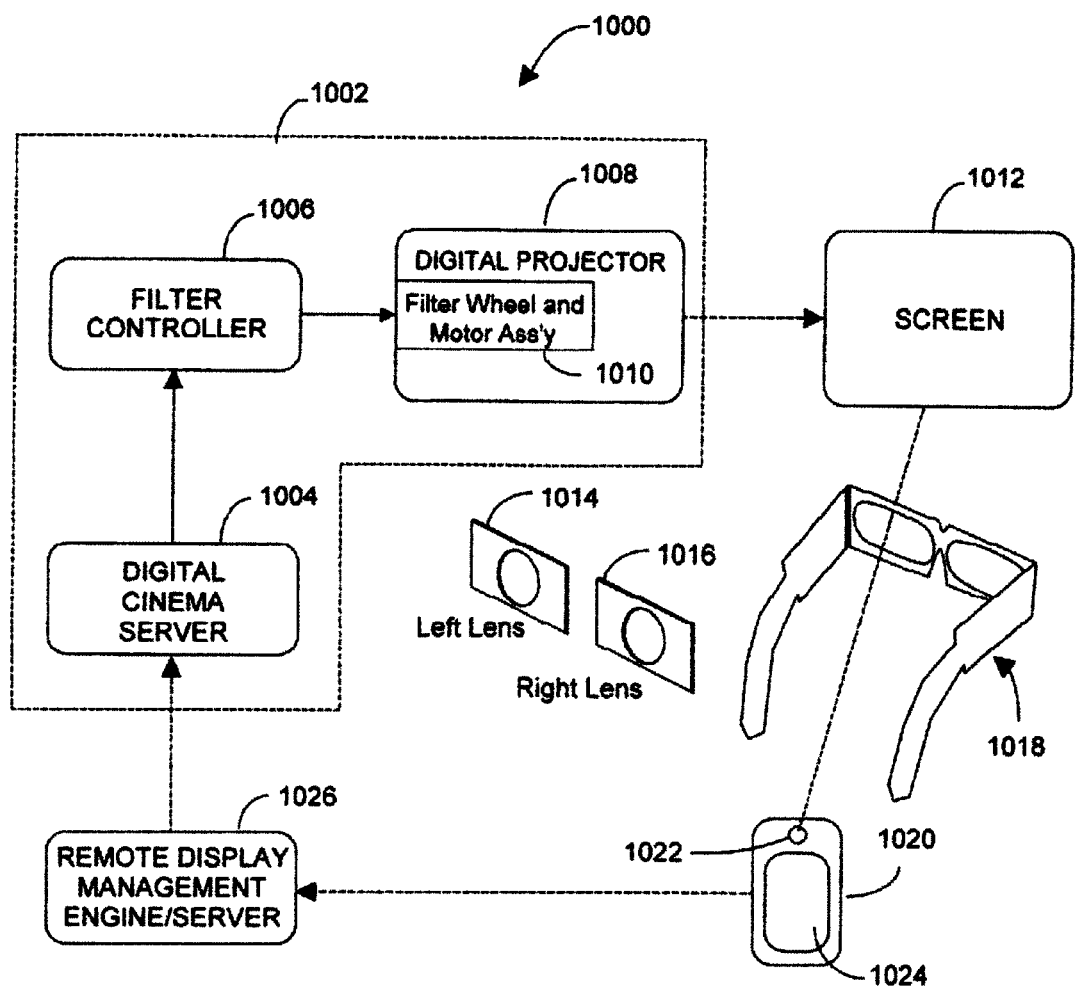
FIG. 10 is one embodiment of a 3D projector system and calibration system.

FIG. 10 shows merely one embodiment of an exemplary 3D projector system 1000 being calibrated in accordance with the principles herein. Projector system 1002 is shown here as comprising a digital projector 1008, digital projector 1008 further comprising filter wheel and motor assembly 1010. Assembly 1010 may be driven by signals emanating from a filter controller 1006—which, in turn, may receive signals from a digital cinema server 1004. Similarly as described above, digital cinema server 1004 may receive signals from a remote display management engine/server 1026. Such engine/server may be coupled—either in a wired or wireless configuration—with a camera device 1020, as it is employed in the calibration of projector system 1002. Camera device 1020 may further comprise a light sensor 1022 and a processor 1024. Many suitable camera devices may suffice for the purposes of this present application, including an iPhone with a measurement application, as described herein. Camera device 1020, as described herein, inputs visual images projected onto and reflected from a screen 1012.

As a starting point and in reference to the discussion preceding, the actual values of the primaries as sensed by a calibrated camera (e.g. CMOS or CCD) can be measured and stored as a setting on the handheld device. This can also be used to calculate the color transfer (matching) functions for the particular handheld device to match the projected primaries. Hence, there may exist a set of primaries color response functions and color matching functions to characterize a specific handheld device camera. Once stored in the handheld device's memory, this can be further used to test the validity and accuracy of the display primaries and white-point.

3D Systems Employing Spectral Separation

Having the data suitably characterizing the camera device, the calibration of the 3D display system will now be described. Typically, the calibration of 3D display screens involves the use of a colorimeter capable of measuring 3D color coefficients for clips of test patterns for Red, Green, Blue and White for Left Eye and Right Eye lenses. The particular technique of calibrating 3D system may also take into consideration the manner in which 3D images are affected. In particular, one 3D technique is known as "spectral separation", which is generally discussed in commonly-owned United States Patent Application Publication Number 2008/0284982 (Ser. No. 11/804,602) entitled "Spectral Separation Filters for 3D Stereoscopic D-Cinema Presentation", and which is incorporated herein by reference in its entirety. As is discussed in the '982 application, spectral separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector.

In the spectral separation method of 3D cinema, either a two projectors or a single projector projection could be employed. Spectral separation is achieved by filtering the left and right eye spectrally in complimentary bands of red, green and blue spectrum between the eyewear and the projector's spectral filter which may be stationary in the case of dual projection or rotary for single projection. While spectral separation results in a full color image, a small reduction in color gamut exists between the filtered image and that of the original image as projected with the color gamut of the projector. As a result of said difference, color correction may be desired to insure a high degree of color accuracy.

Digital projector 1008 may be either a dual projection system or a single projection system. A dual projection system comprises of a cinema server, a filter controller and two digital projectors. A single projection comprises of a cinema server, a filter wheel controller and a projector with a rotary filter wheel and motor assembly.

FIG. 10 shows a system for capturing color coefficients for color primaries for the Left Eye and Right Eye lenses, 1014 and 1016 respectively—which may match the lenses on 3D glasses 1018 used for the 3D projector. Alternatively, left lens 1014 and right lens 1016 may be used alone, apart from the glasses. The captured data is used to dynamically tone mapping and dynamically preprocessing the input video signal using display management parameters generated by a remote server. For the purposes of analyzing light via camera 1020, light may be passed through 3D glasses (left and right eye respectively) or through separate left and right lens 1014, 1016 respectively. Such individual lenses might also be sold separately, as in a calibration kit.

Using techniques described herein, measurements for color and luminance of a projected test pattern can be made using a handheld device. These measurements can be filtered/processed using a measurement/acquisition application running on the handheld device and forwarded to a remote server which performs the analysis and generates new parameters for better display management of the concerned system that are sent over to the video preprocessor.

For a particular handheld device (Example: iPhone), the manufacturer can package the color matching functions and color response functions for a particular display into a file (for example, XML). When a user wants to recalibrate the color or the contrast of a display, the user may load up the application which will make the necessary measurements and compare them against the parameters in the file corresponding to the measured display. The differences could be used for one or more of the following:

1. Auto-recalibration of 3D display projection.
2. Feedback preprocessing of the content for accurate 3D display management.
3. Uniformity assessment and evaluation of the 3D projection and screen by preselecting positions on the screen that may be used as pivots for repeated measurements.

These functions may be accomplished using the systems and techniques as described above in reference to direct view LCD displays and advanced imaging systems such as semiconductor laser-based projection, organic light-emitting diodes (OLEDs) and Quantum-Dot based display systems.

The technology described in this document can be implemented in a wide range of handheld devices. For example, by using the Image Picker Controller class in the iPhone SDK, we can collect data from the iPhone's backside-illuminated CMOS camera sensor. The techniques described herein, e.g. in reference to FIG. 7, may be employed with suitable modification to characterize and/or calibrate 3D systems.

Figure 11:
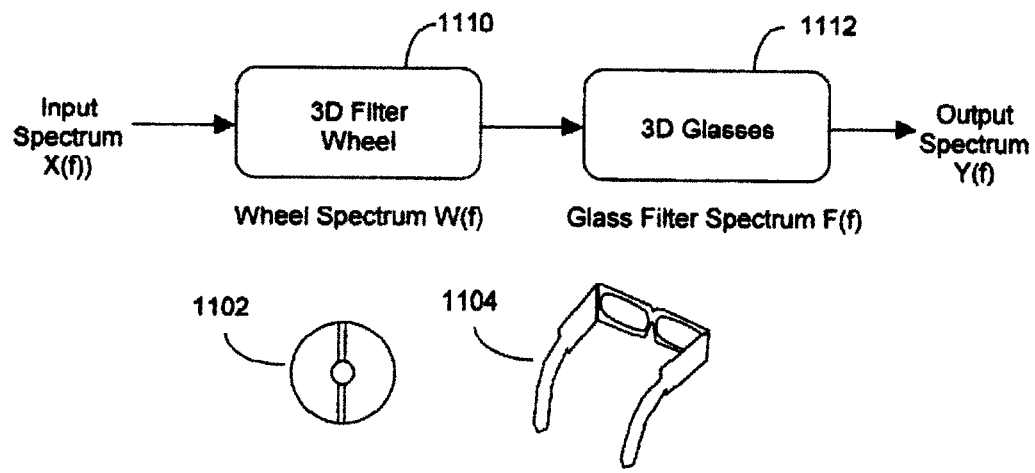
FIG. 11 is a block diagram of the transfer functions that apply to an image signal in one embodiment of a 3D projector system.

FIG. 11 depicts one embodiment of a system and method for characterizing and/or calibrating a 3D projector system. As with the discussion above, any filter or optical element generally in the light path of the projected system may be characterized by a transfer function. As shown, 3D color filter wheel 1102 and 3D glasses 1104 (or alternatively, left and right lenses 1014 and 1016 respectively) may be characterized by their transfer functions W(f) and F(f) (1110 and 1112 respectively). These transfer functions may be calculated or derived as described herein—or, alternatively, may be determined either experimentally or heuristically.

If the transfer functions are taken into the frequency domain, as known in the art, then for a given source spectrum X(f), an output spectrum Y(f) may be calculated by multiplication of the various transfer functions in the optical path of the image.

$$Y(f)=F(f)\times W(f)\times X(f)$$

Figure 12:
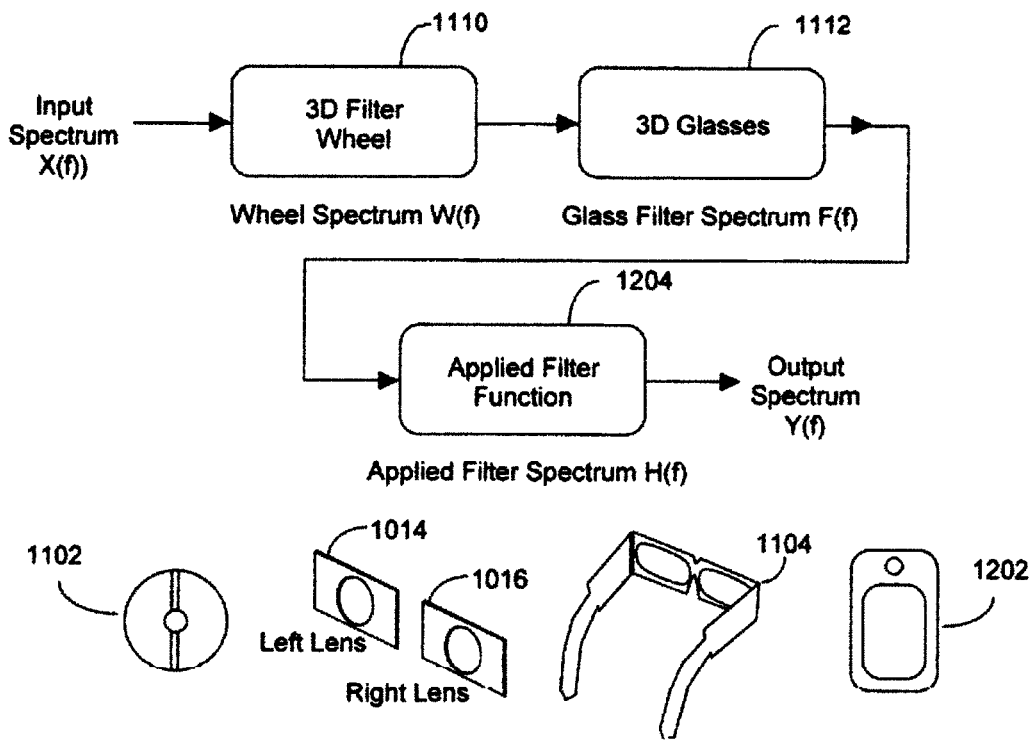
FIG. 12 is a block diagram of the transfer function that apply to the calibration system of a 3D projector system.

FIG. 12 depicts the situation for a particular recalibration to a target spectrum Y(f), it is possible to compute the applied filter spectrum H(f) as described above.
The basic equation:

$$Y(f)=H(f)\times F(f)\times W(f)\times X(f)$$

translates to:

$$H(f)=Y(f)/[F(f)\times W(f)\times X(f)]$$

From the computed H(f), it is possible to arrive at a matrix to better approximate the color RGB rotation matrix for a particular set of output color primaries.

Figure 13A:
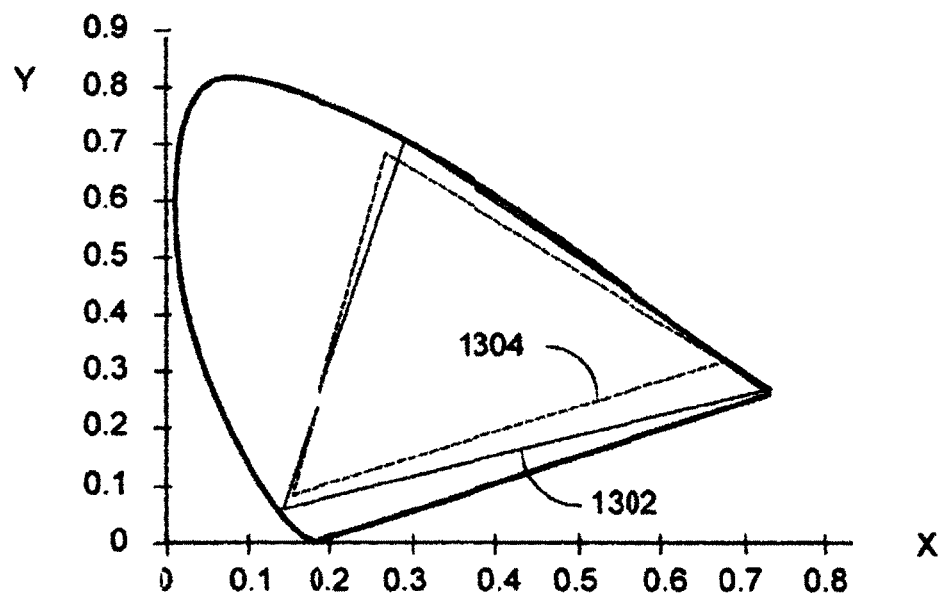
FIGS. 13A and 13B are exemplary gamuts of a 3D projector image, as may be viewed by at least one eye's view in a calibrated and uncalibrated format, respectively.

For example, FIG. 13A depicts the analysis of the R, G and B primaries, as seen by e.g. the right eye of the 3D glasses, for a spectrally flat calibrated light source shining light through a perfectly calibrated color filter wheel—as indicated by the gamut triangle 1302. By comparison, the gamut triangle 1304 refers to the projection of the P3 color space.

Figure 13B:
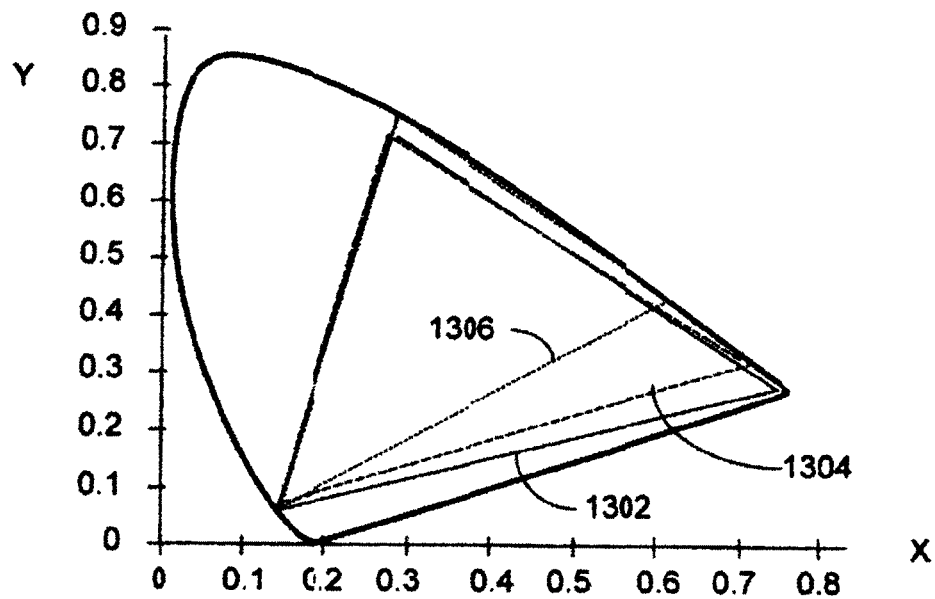

FIG. 13B depicts the analysis for an un-calibrated light source or un-calibrated filter wheel. As seen, the R, G and B primaries seen by the right eye of the 3D glasses (as indicated by the gamut triangle 1306) are different from the calibrated state. From the knowledge of the gamut triangles 1306 and 1302 and the spectral transmission characteristics, we can arrive at the filter spectrum H(f) and approximate it as a 3×3 color rotation matrix.

3D Calibration method presented herein may be extended beyond spectral separation, circular polarization, and active shutter glasses technologies. For example, organic light-emitting diodes (OLEDs) have been known to have a uniformity issue when screen life approach design limit. Typically, blue OLEDs have shorter lifespans than those of red and green OLEDs thus resulting in a significant reduction in brightness, color accuracy and uniformity. Said calibration method could also be used in semiconductor laser-based projection and direct display systems. In this embodiment, the HHD calibration system is employed as a diagnostic and calibration tool, for example, in adjustment of level of intensity to accommodate damaged micromirrors exposed to high heat for extended period of time.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A method for calibrating a 3D display, using a camera device which includes a camera, said method including steps of:
   (a) operating the camera to measure light emitted from the display, and as filtered by one or more optical elements designed to render 3D effects, using the camera, said camera having a sensitivity function that is unknown a priori, and operating the camera device to generate measurement data indicative of the light
   such that the measurement data are indicative of at least one measurement of said light by a reference camera having known sensitivity function; and
   (b) using the measurement data as feedback for controlling calibration of the display;
   wherein step (a) includes steps of:
   operating the camera device to measure light emitted from the display using the camera while said display displays at least one test image, wherein the at least one test image is indicative of at least one test color and at least one white point; and
   providing reference data to the camera device for use in generating the measurement data, wherein the reference data are indicative of:
   values of a transfer function matching the display's response, to each said test color and each said white point, to the reference camera's response to each said test color and each said white point; and
   values of the reference camera's sensitivity function.

2. The method of claim 1, wherein one or more optical elements designed to be used to render 3D effects comprises a group, said group comprising: colored filter wheels, polarizing glasses, and color filtered glasses.

3. The method of claim 1, wherein during step (a), the camera measures the light emitted from the display while said display displays at least one test pattern.

4. The method of claim 1, wherein the camera device is a handheld camera device.

5. The method of claim 1, wherein the values of the reference camera's sensitivity function are $f_c(\lambda)$, for each wavelength $\lambda$ in a set of wavelengths, the values of the transfer function are $f_T(\lambda)=f_D(\lambda)/f_c(\lambda)$, where values $f_D(\lambda)$ are indicative of output of the display in response to each said test color and each said white point at each said wavelength in the set of wavelengths as measured by the reference camera, and wherein the reference data are also indicative of the values $f_D(\lambda)$, and step (a) includes steps of:

operating the camera device to measure light emitted by the display, thereby determining values of the display's output, $f'_D(\lambda)$, in response to each said test color and each said white point at each said wavelength in the set of wavelengths;

determining values $f'_c(\lambda)=f'_D(\lambda)/(f_D(\lambda)/f_c(\lambda))$, at each said wavelength in the set of wavelengths from the $f'_D(\lambda)$ values and the reference data; and generating the measurement data to be indicative of a difference value $d_D(\lambda)=(f_c(\lambda)/f'_c(\lambda))*(f'_D(\lambda)-f_D(\lambda))$, at each said wavelength in the set of wavelengths.

6. The method of claim 5, wherein step (b) includes the steps of:

generating preprocessor control parameters in response to the measurement data; and operating a video preprocessor to recalibrate the display in response to the preprocessor control parameters.

7. The method of claim 1, wherein the values of the reference camera's sensitivity function are $f_c(\lambda)$, for each wavelength $\lambda$ in a set of wavelengths, the values of the transfer function are $f_T(\lambda)=f_D(\lambda)/f_c(\lambda)$, where values $f_D(\lambda)$ are indicative of output of the display in response to each said test color and each said white point at each said wavelength in the set of wavelengths as measured by the reference camera, and wherein step (a) includes steps of:

at a first time, operating the camera device to measure light emitted by the display, thereby determining values of the display's output, $f'_D(\lambda)$, in response to each said test color and each said white point at each said wavelength in the set of wavelengths;

determining values $f'_c(\lambda)=f'_D(\lambda)/(f_D(\lambda)/f_c(\lambda))$, at each said wavelength in the set of wavelengths from the $f'_D(\lambda)$ values and the reference data;

at a second time, after the first time, again operating the camera device to measure light emitted by the display in response to each said test color and each said white point to determine values of the display's output, $f''_D(\lambda)$, at each said wavelength in the set of wavelengths; and generating the measurement data to be indicative of a value $f'''_D(\lambda)=(f_c(\lambda)/f'_c(\lambda))*f''_D(\lambda)$, at each said wavelength in the set of wavelengths.

8. The method of claim 1, wherein the values of the reference camera's sensitivity function are $f_c(\lambda)$, for each wavelength $\lambda$ in a set of wavelengths, the values of the transfer function are $f_T(\lambda)=f_D(\lambda)/f_c(\lambda)$, where values $f_D(\lambda)$ are indicative of output of the display in response to each said test color and each said white point at each said wavelength in the set of wavelengths as measured by the reference camera, and wherein step (a) includes steps of:

at a first time, operating the camera device to measure light emitted by the display, thereby determining values of the display's output, $f'_D(\lambda)$, in response to each said test color and each said white point at each said wavelength in the set of wavelengths;

determining values $f'_c(\lambda)=f'_D(\lambda)/(f_D(\lambda)/f_c(\lambda))$, at each said wavelength in the set of wavelengths from the $f'_D(\lambda)$ values and the reference data;

at a second time, after the first time, again operating the camera device to measure light emitted by the display in response to each said test color and each said white point to determine values of the display's output, $f''_D(\lambda)$, at each said wavelength in the set of wavelengths; and generating the measurement data to be indicative of a difference value $d_D(\lambda)=(f_c(\lambda)/f'_c(\lambda))*(f''_D(\lambda)-f_D(\lambda))$, at each said wavelength in the set of wavelengths.

9. The method of claim 8, wherein step (b) includes the steps of:

generating preprocessor control parameters in response to the measurement data; and operating a video preprocessor to recalibrate the display in response to the preprocessor control parameters.

10. The method of claim 1, wherein step (b) includes the steps of:

generating preprocessor control parameters in response to the measurement data; and operating a video preprocessor to calibrate the display in response to the preprocessor control parameters.

11. The method of claim 10, wherein the video preprocessor is operated to perform all of color, contrast, and dynamic range calibration of the display in response to the preprocessor control parameters.

12. The method of claim 10, wherein the camera device includes a processor coupled and configured to receive raw output from the camera and to process the raw output to generate the measurement data, and step (b) includes the step of:

sending the measurement data to a remote server, and operating the remote server to generate the preprocessor control parameters in response to the measurement data.

13. A 3D display calibration system, including:

a 3D display;

a camera device including a camera operable to measure light emitted from the display and as filtered by one or more optical elements designed to render 3D effects, said camera having a sensitivity function that is unknown a priori, the camera device also including a processor coupled and configured to receive raw output from the camera and to process the raw output to generate measurement data indicative of the light, such that the measurement data are indicative of at least one measurement of said light by a reference camera having known sensitivity function; and a calibration subsystem coupled and configured to generate control parameters in response to the measurement data, and to calibrate the display in response to the control parameters;

wherein the raw output from the camera is indicative of at least one measurement of light emitted from the display while said display displays at least one test image indicative of at least one test color and at least one white point, and the processor is configured to generate the measurement data in response to reference data and the raw output from the camera, wherein the reference data are indicative of:

a transfer function matching the display's response, to each said test color and each said white point, to the reference camera's response to each said test color and each said white point; and values of the reference camera's sensitivity function.

14. The system of claim 13, wherein the camera device is a handheld camera device and said one or more optical elements comprising a group, said group comprising: colored filter wheels, polarizing glasses, and color filtered glasses.

15. The system of claim 13, wherein the camera device is a handheld camera device.

16. The system of claim 13, wherein the control parameters are preprocessor control parameters, and the calibration subsystem includes:

a remote server coupled and configured to generate the preprocessor control parameters in response to the measurement data; and a video preprocessor coupled and configured to calibrate the display by performing preprocessing on image data to be displayed, in response to the preprocessor control parameters.

17. The system of claim 16, wherein the video preprocessor is operable to perform all of color, contrast, and dynamic range calibration of the display in response to the preprocessor control parameters.

18. A system, including:
a 3D display;
a video preprocessor coupled to the display; and
a feedback subsystem including a measurement device operable to measure light emitted by the display, wherein the feedback subsystem is coupled and configured to generate preprocessor control parameters automatically in response to measurement data indicative of measurements by the handheld device and to assert the preprocessor control parameters as calibration feedback to the video preprocessor;
wherein the measurement device includes,
a camera operable to measure the light emitted from the display and filtered by one or more optical elements configured to render 3D effects, said camera having a sensitivity function that is unknown a priori; and
a processor coupled and configured to receive raw output from the camera and to process the raw output to generate the measurement data, such that said measurement data are indicative of at least one measurement of said light by a
reference camera having known sensitivity function; and
wherein the raw output from the camera is
indicative of at least one measurement of light emitted from the display while said display displays at least one test image indicative of at least one test color and at least one white point, and the processor is configured to generate the measurement data in response to reference data and the raw output from the camera, wherein the reference data are indicative of:
a transfer function matching the display's response, to each said test color and each said white point, to the reference camera's response to each said test color and each said white point; and
values of the reference camera's sensitivity function.

19. The system of claim 18, wherein the handheld device is a handheld camera device; and
wherein further said handheld device is optically coupled to at least one optical element capable of rendering 3D effects to a viewer.

20. The system of claim 19, wherein the video preprocessor is coupled to
receive the preprocessor control parameters and operable to calibrate the display in response to said preprocessor control parameters by filtering input image data to be displayed by the display.

21. The system of claim 18, wherein the handheld device is a handheld camera device, and the video preprocessor is coupled to receive the preprocessor control parameters and operable to calibrate the display in response to said preprocessor control parameters by filtering input image data to be displayed by the display.

22. The system of claim 18, wherein the feedback subsystem also includes:
a remote server coupled and configured to generate the preprocessor control parameters in response to the measurement data, and to assert said preprocessor control parameters to the video preprocessor.

23. The system of claim 18, wherein the measurement device is a handheld device.

24. The system of claim 23, wherein the handheld device is a connected device connect to at least a display management server configured to update display management parameters of the display.

25. The system of claim 18, wherein the video preprocessor is operable to perform all of color, contrast, and dynamic range calibration of the display in response to the preprocessor control parameters.

26. A method for calibrating a display system with a measurement device said display system comprising one or more optical elements configured to render images to at least one user, said measurement device comprising a camera and a connection to a processor, said processor having storage to store data corresponding to the transfer functions of said one or more optical elements, transfer function of said camera and reference light values from at least one test image, wherein said camera is an add-on function to the measurement device produced for consumer markets outside of professional reference devices, the steps of said method comprising:
measuring light values produced from said display system with said camera, said light values being produced from a test image;
applying transfer functions to said light values as measured to produce an intermediate light values;
comparing the intermediate light values with reference light values; and
sending corrective control signal to said display system;
wherein:
said one or more optical elements configured to render images comprises a group, said group comprising at least one element configured to produce at least one color light and an optical element operative on the at least one color light;
a descriptive function of said at least one element configured to produce at least one color light is W(f);
a transfer function of said at least one optical element operative on the at least one color light is F(f);
a transfer function of said camera is H(f); and
a transfer function of said light values produced by said test images is X(f);
the step of applying transfer functions further comprises calculating intermediate light values Y(f); and
the step of calculating intermediate light values comprises:

$$Y(f)=H(f) \times F(f) \times W(f) \times X(f).$$

27. The method of claim 26 wherein the at least one color light comprises a narrowband light.

28. The method of claim 27 the optical element operative on the at least one color light comprises 3D glasses.

29. The method of claim 28 wherein the 3D glasses comprise at least one of spectral separation, polarization, and shutter types of 3D glasses.

30. The method of claim 27 wherein the optical element comprises at least one of a filter wheel, laser lights, LEDs, OLEDs, LCD panels, or other display/projector technologies.

31. The method of claim 30 wherein the step of calculating intermediate light values comprises
calculating light values for at least one of laser, LED, OLED, projector, backlight, and edge light sources.

32. The method of claim 26, wherein the display system comprises a laser based display system.

33. The method of claim 26, wherein the display system comprises a 3D laser projector.

34. The method according to claim 26, wherein the measurement device is a connected personal handheld device such as a smart phone in communication with a display management server or engine operative with said display system.

35. The method according to claim 34, wherein the connected personal handheld device is a smart phone that runs an application configured mainly to take photos and/or measurements, transfer photos and/or measurement data to the display management server or engine in support of said method.

36. The method according to claim 26, wherein the display system comprises one of a polarization based 3D display system, a spectral separation based 3D display system, and a laser 3D display system.

* * * * *